United States Patent
Blackhurst et al.

(10) Patent No.: US 8,571,983 B1
(45) Date of Patent: Oct. 29, 2013

(54) GIFT CARD COMBINATION

(71) Applicant: Bank of America Corporation, Charlotte, NC (US)

(72) Inventors: Jason Blackhurst, Charlotte, NC (US); Dean Lyons Henry, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/646,946

(22) Filed: Oct. 8, 2012

(51) Int. Cl.
*G06Q 40/00* (2012.01)

(52) U.S. Cl.
USPC .................................. 705/39; 705/35; 705/40

(58) Field of Classification Search
USPC .............................................. 705/35, 39, 40
See application file for complete search history.

(56) References Cited

U.S. PATENT DOCUMENTS

| | | | | |
|---|---|---|---|---|
| 7,753,264 | B2* | 7/2010 | Shafer et al. | 235/380 |
| 7,765,124 | B2* | 7/2010 | Postrel | 705/14.3 |
| 8,180,706 | B2* | 5/2012 | Bishop et al. | 705/39 |
| 2006/0027647 | A1* | 2/2006 | Deane et al. | 235/380 |
| 2009/0006212 | A1* | 1/2009 | Krajicek et al. | 705/14 |
| 2009/0037275 | A1* | 2/2009 | Pollio | 705/14 |
| 2009/0287564 | A1* | 11/2009 | Bishop et al. | 705/14.38 |
| 2011/0010238 | A1* | 1/2011 | Postrel | 705/14.38 |
| 2011/0131107 | A1 | 6/2011 | Hurst | |
| 2011/0295744 | A1 | 12/2011 | Wisniewski et al. | |
| 2012/0054000 | A1* | 3/2012 | Boppert et al. | 705/14.1 |
| 2012/0059701 | A1* | 3/2012 | van Der Veen et al. | 705/14.17 |
| 2012/0143759 | A1* | 6/2012 | Ritorto et al. | 705/44 |

OTHER PUBLICATIONS

Werden, Kristina. "How to Combine Visa Gift Cards." eHow.com. 1 page. http://www.ehow.com/how_6216118_combine-visa-gift-cards.html. Retrieved Jan. 8, 2013.

Zumiez.com. "The Zumiez Gift Card—Combine Your Gift Cards." 1 page. http://www.zumiez.com/giftcard/index/combine. Retrieved Jan. 8, 2013.

* cited by examiner

*Primary Examiner* — Lalita M Hamilton

(74) *Attorney, Agent, or Firm* — Michael A. Springs; Moore & Van Allen PLLC; Sreenivas Vedantam

(57) ABSTRACT

Embodiments of the invention are directed to systems, methods and computer program products for enabling gift card combination. An exemplary apparatus is configured to: receive information associated with a first gift card; associate the first gift card with an account; receive information associated with a second gift card; associate the gift card with the account; and enable combining the first gift card and the second gift card into an asset determined by a user of the account.

18 Claims, 26 Drawing Sheets

GIFT CARD COMBINATION

BACKGROUND

A gift card is a monetary amount that issued by a merchant to be redeemed for purchases associated with merchants. There is a need for updating the process of how gift cards work.

BRIEF SUMMARY

Embodiments of the invention are directed to systems, methods, and computer program products for enabling gift card combination. In some embodiments, an apparatus is provided for enabling gift card combination. The apparatus comprises a memory; a processor; and a module stored in the memory, executable by the processor, and configured to: receive information associated with a first gift card; associate the first gift card with an account; receive information associated with a second gift card; associate the gift card with the account; and enable combining the first gift card and the second gift card into an asset determined by a user of the account.

In some embodiments, the second gift card is unassociated with the first gift card.

In some embodiments, the asset comprises a third gift card associated with a merchant or merchant category determined by the user.

In some embodiments, an amount of the third gift card is based on a balance of the first gift card and a balance of the second gift card.

In some embodiments, the asset comprises points associated with a merchant or merchant category determined by the user.

In some embodiments, the asset comprises funds.

In some embodiments, an amount of the funds is at least one of less than, equal to, or greater than a sum of a balance of the first gift card and a balance of the second gift card.

In some embodiments, the asset enables payment of a bill.

In some embodiments, the module is configured to initiate presentation of a comparison of various assets generated based on a combination of the first gift card and the second gift card In some embodiments, the asset comprises a plurality of assets.

In some embodiments, the module is configured to enable combining the first gift card and the second gift card into an asset determined by the user based on determining a balance of the first gift card is less than or equal to a first predetermined balance and determining a balance of the second gift card is less than or equal to a second predetermined balance.

In some embodiments, the module is configured to enable combining the first gift card and the second gift card into an asset determined by the user based on determining a balance of the first gift card is greater than or equal to a first predetermined balance and determining a balance of the second gift card is greater than or equal to a second predetermined balance.

In some embodiments, the module is configured to transmit a message to the user notifying the user of an option to combine the first gift card and the second gift card into the asset determined by the user, wherein the message is transmitted via at least one of email, text or multimedia message, a social network, or a financial institution network.

In some embodiments, the message is transmitted based on occurrence of a triggering event.

In some embodiments, the asset can be reconverted into the first gift card and the second gift card.

In some embodiments, the account comprises at least one of a financial institution account, a social networking account, or a merchant account.

In some embodiments, the module is further configured to: receive information associated with a transaction; determine the transaction qualifies for the asset (e.g. a third gift card); and apply funds associated with the asset to the transaction.

In some embodiments, the transaction qualifies for the asset if the transaction is associated with a merchant or merchant category associated with the asset, wherein the transaction is executed using a payment method associated with the account.

In some embodiments, the transaction qualifies for the asset based on at least one of the transaction is executed during a predetermined period or before a predetermined expiration time, the transaction is associated with a particular type of purchase, the transaction is executed by a particular user associated with the account, the transaction is executed at a particular location, the transaction is executed using a particular payment method, or the transaction satisfies a predetermined minimum or maximum transaction amount.

In some embodiments, a method is provided for enabling gift card combination. The method comprises: receiving information associated with a first gift card; associating the first gift card with an account; receiving information associated with a second gift card; associating the gift card with the account; and enabling combining the first gift card and the second gift card into an asset determined by a user of the account.

In some embodiments, a computer program product is provided for enabling gift card combination. The computer program product comprises a non-transitory computer-readable medium comprising a set of codes for causing a computer to: receive information associated with a first gift card; associate the first gift card with an account; receive information associated with a second gift card; associate the gift card with the account; and enable combining the first gift card and the second gift card into an asset determined by a user of the account.

BRIEF DESCRIPTION OF THE DRAWINGS

Figure 1:
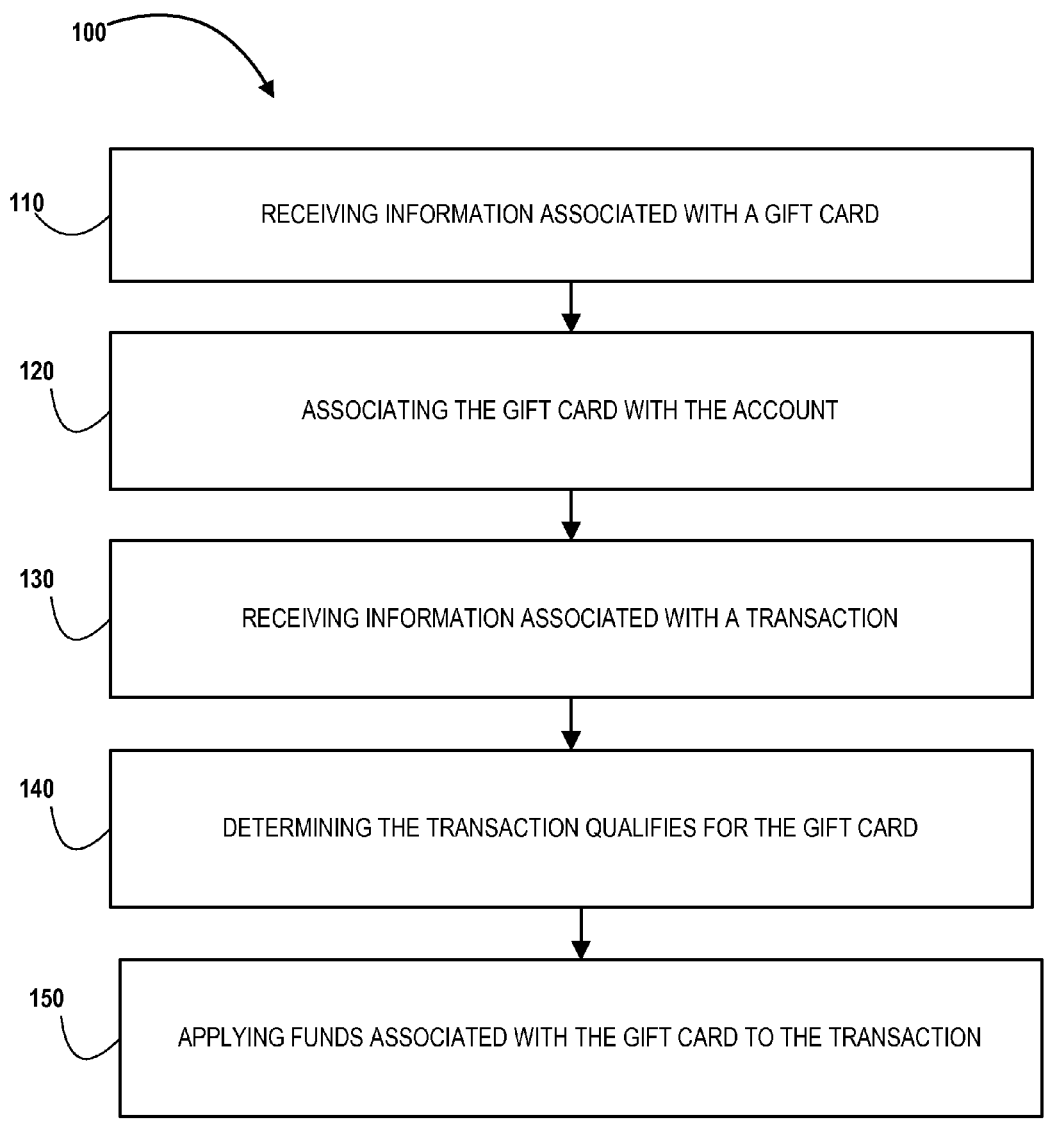
Figure 2:
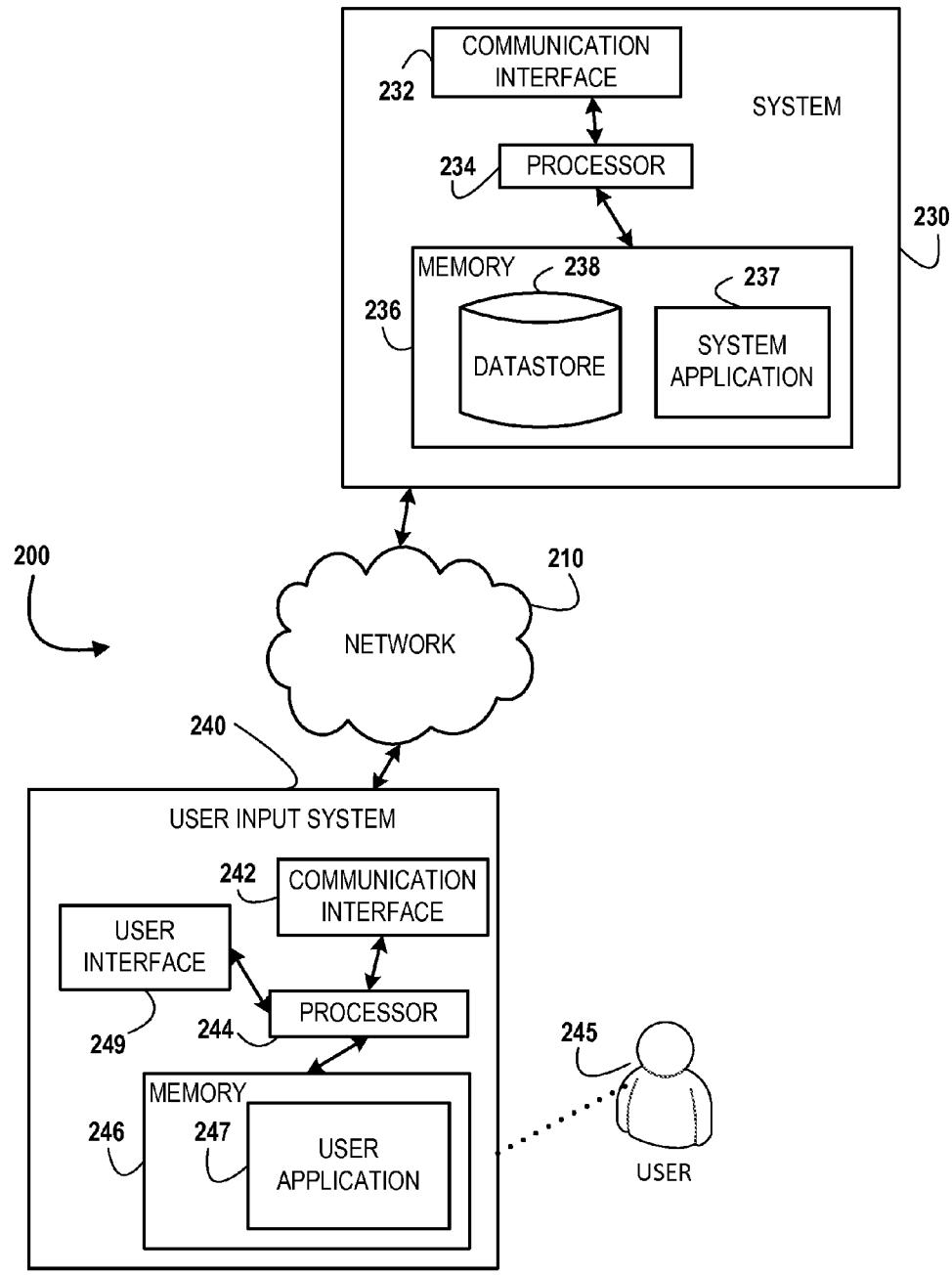
Figure 3:
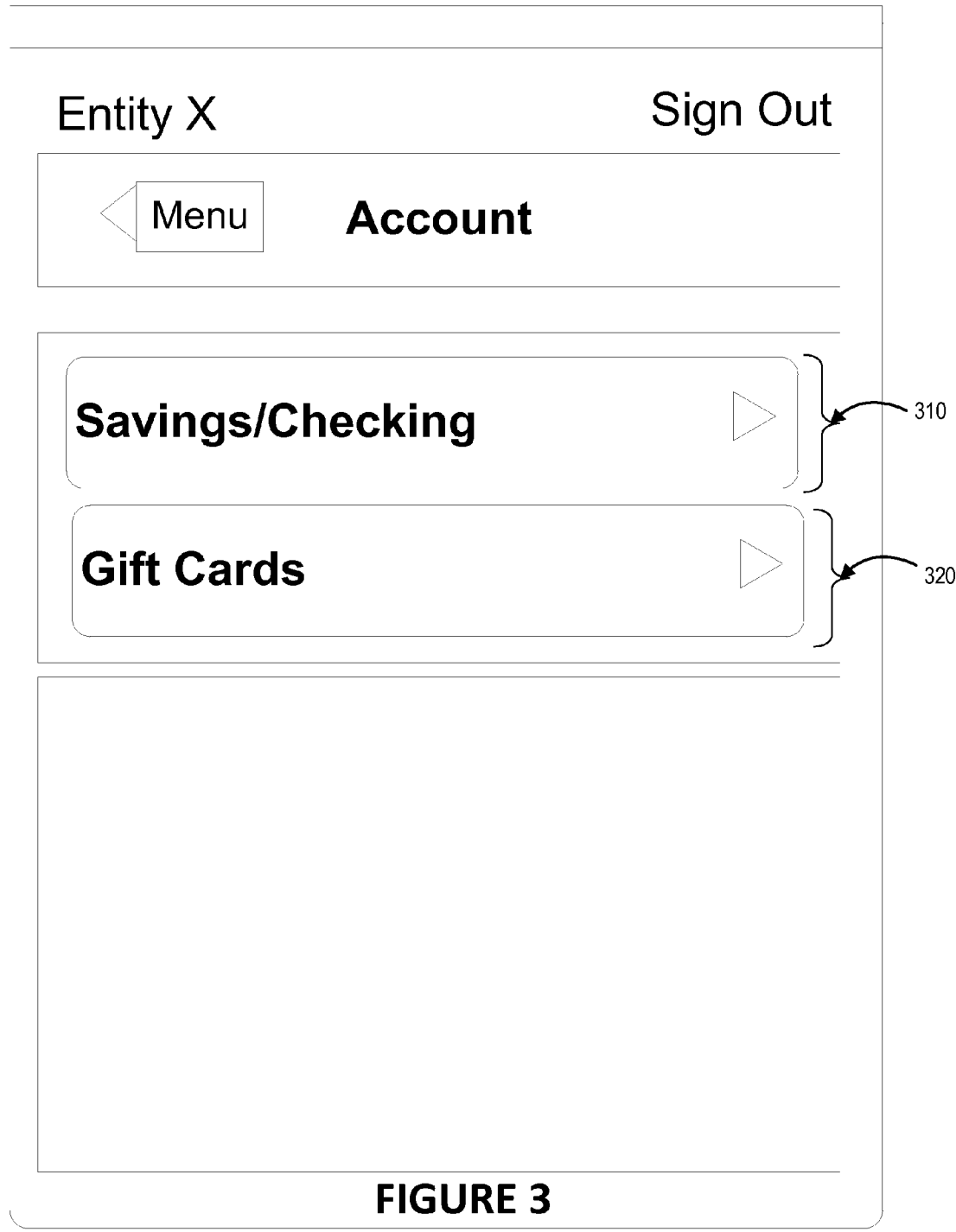
Figure 4:
Figure 8:
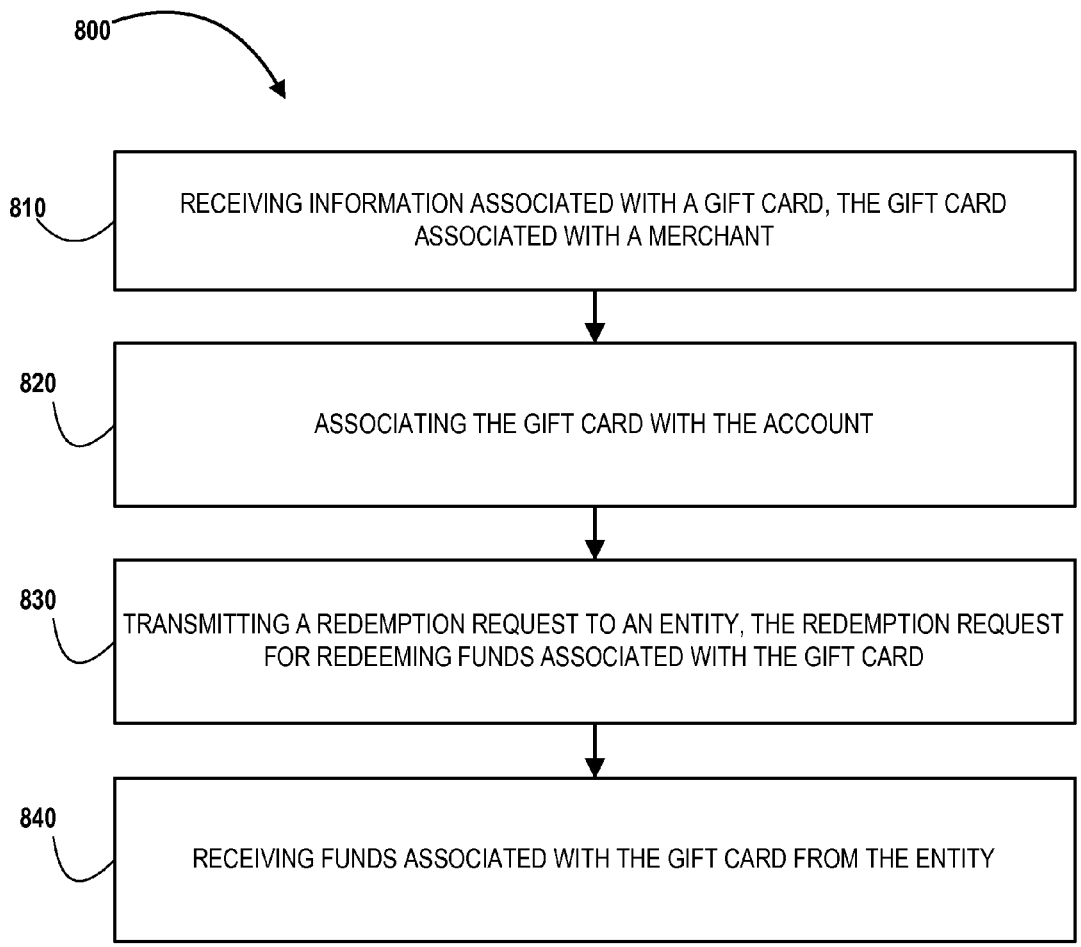
Figure 9:
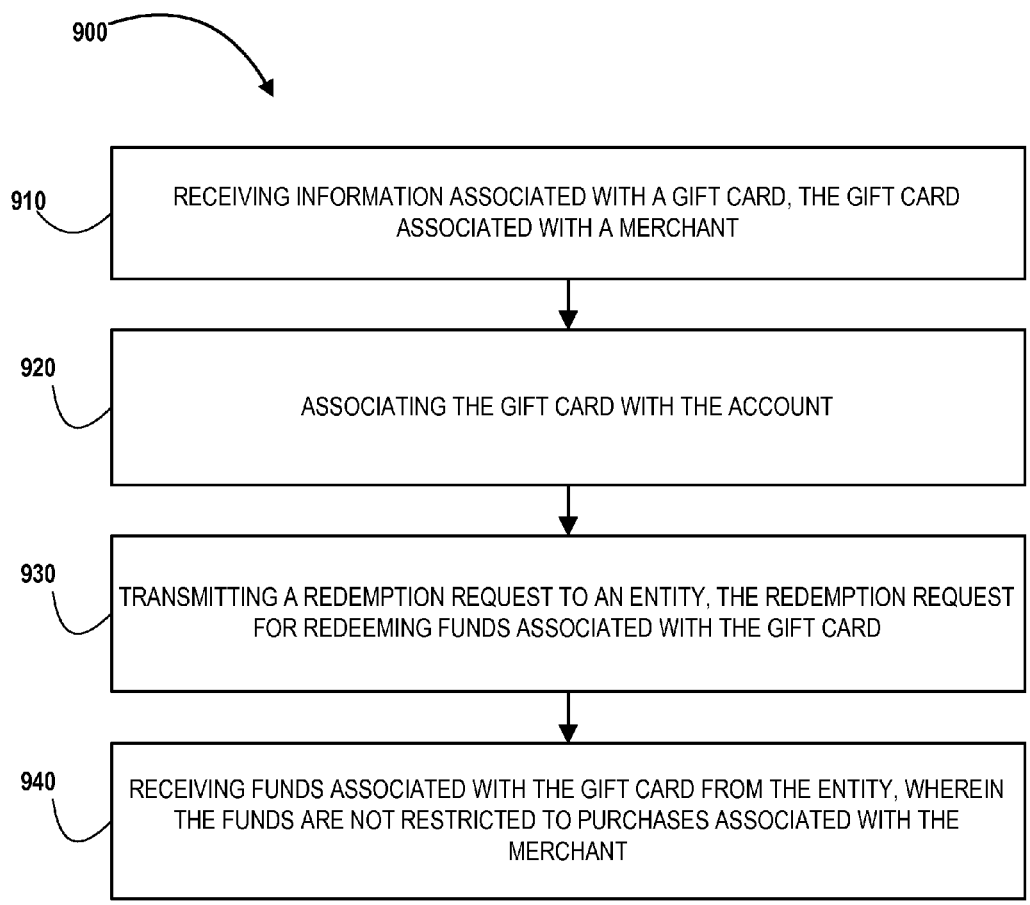
Figure 10:
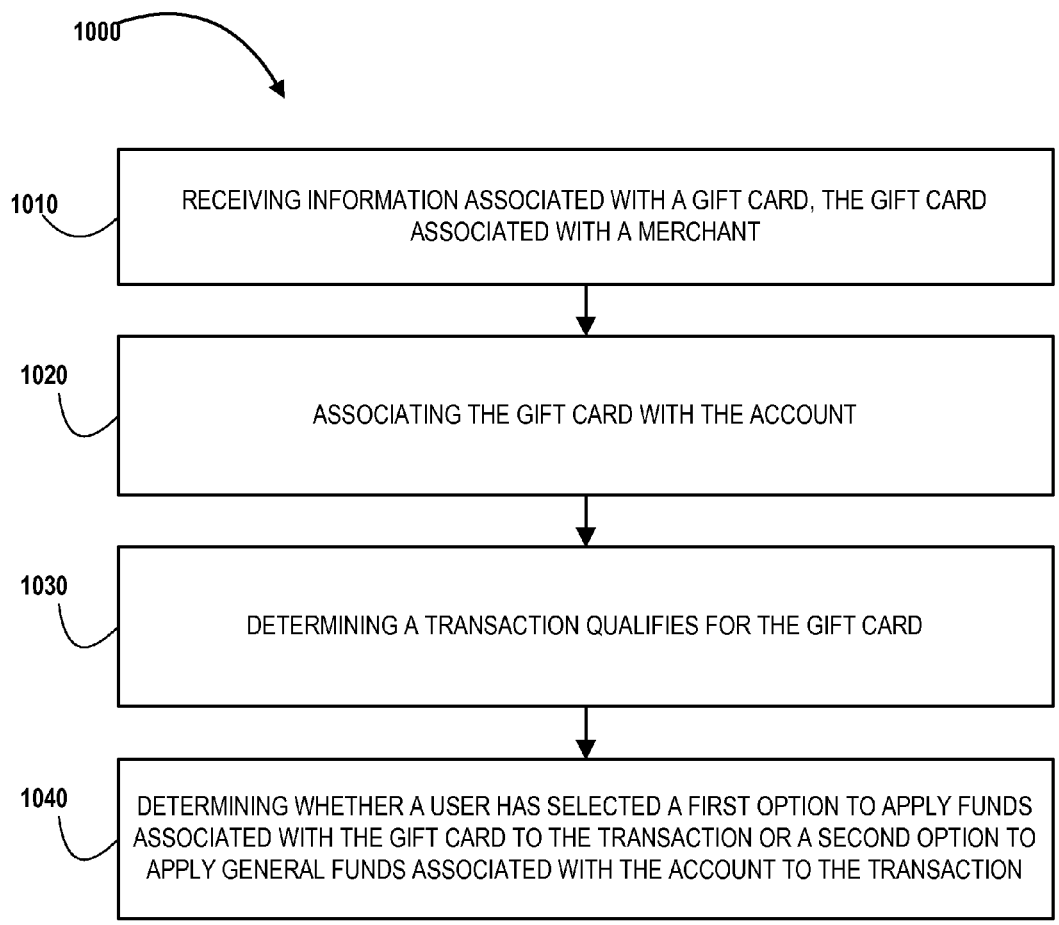
Figure 11:
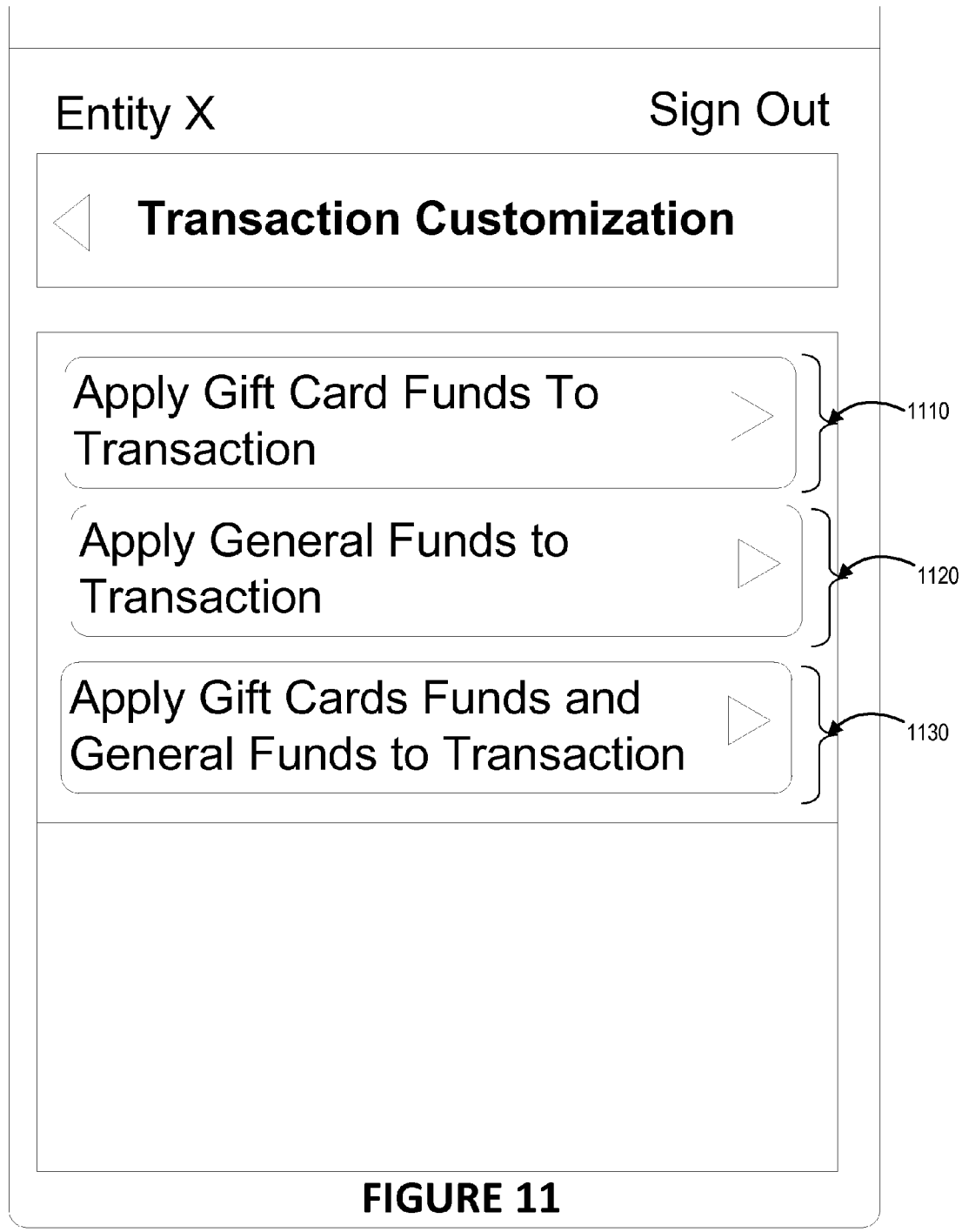
Figure 12:
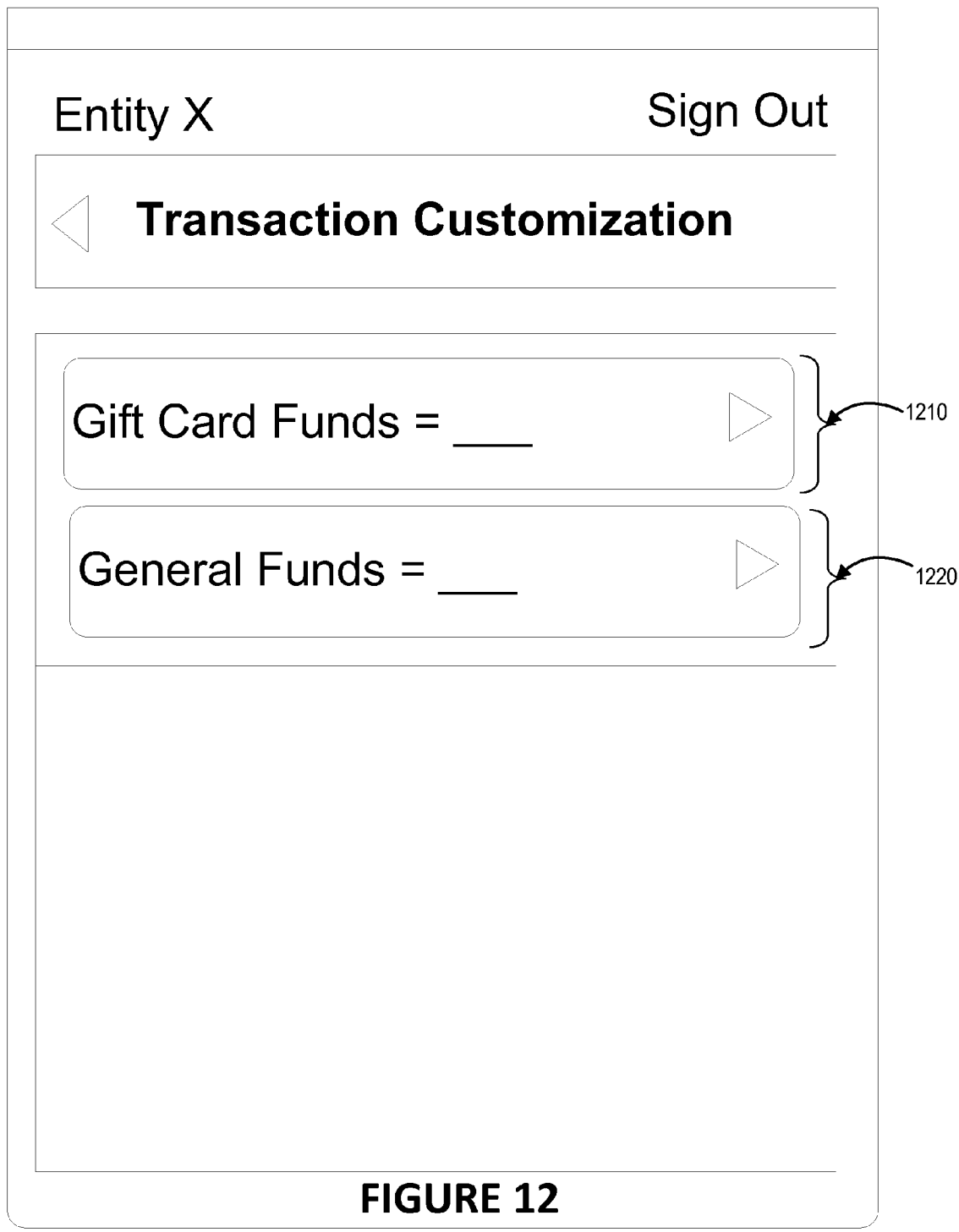
Figure 13:
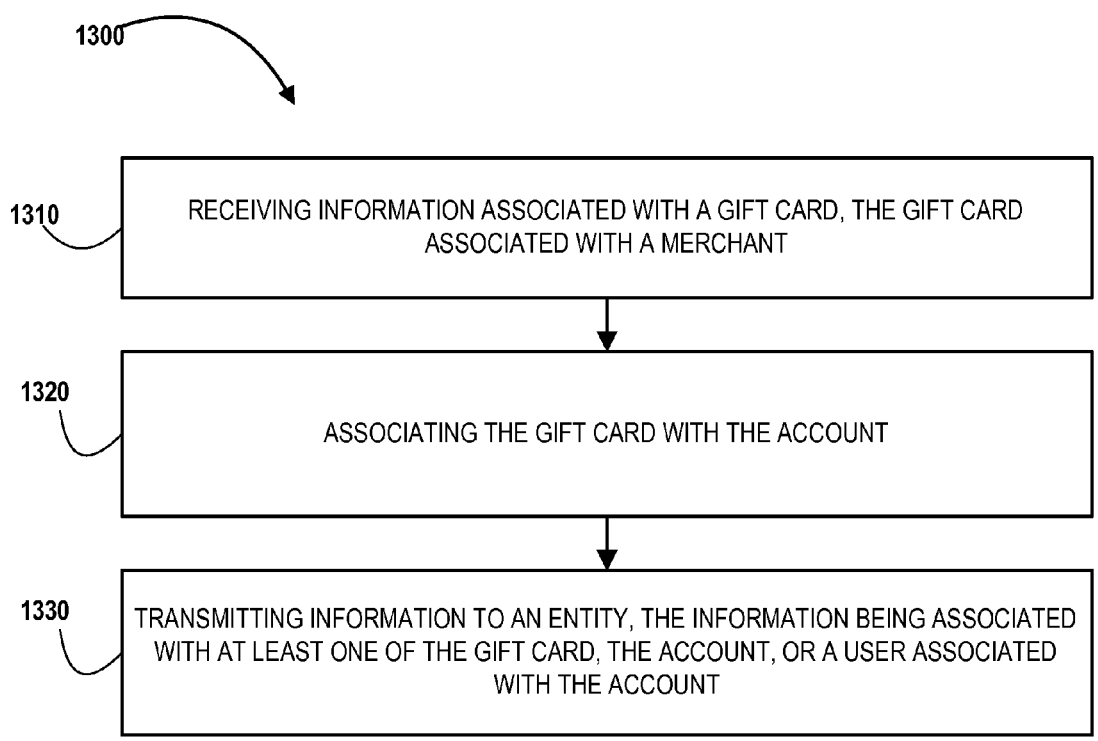
Figure 14:
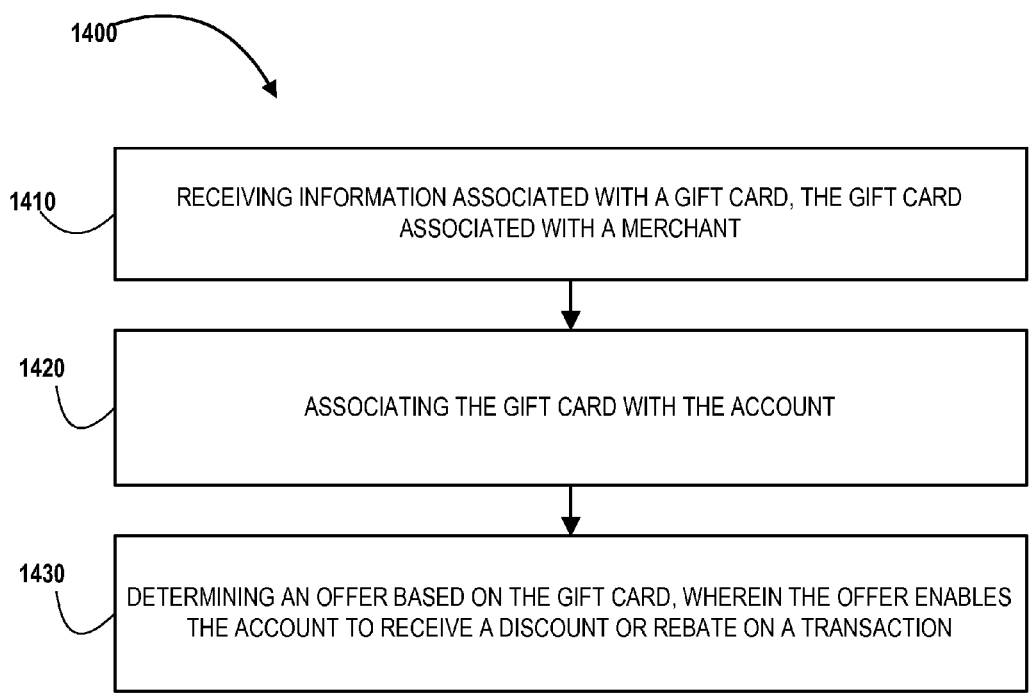
Figure 15:
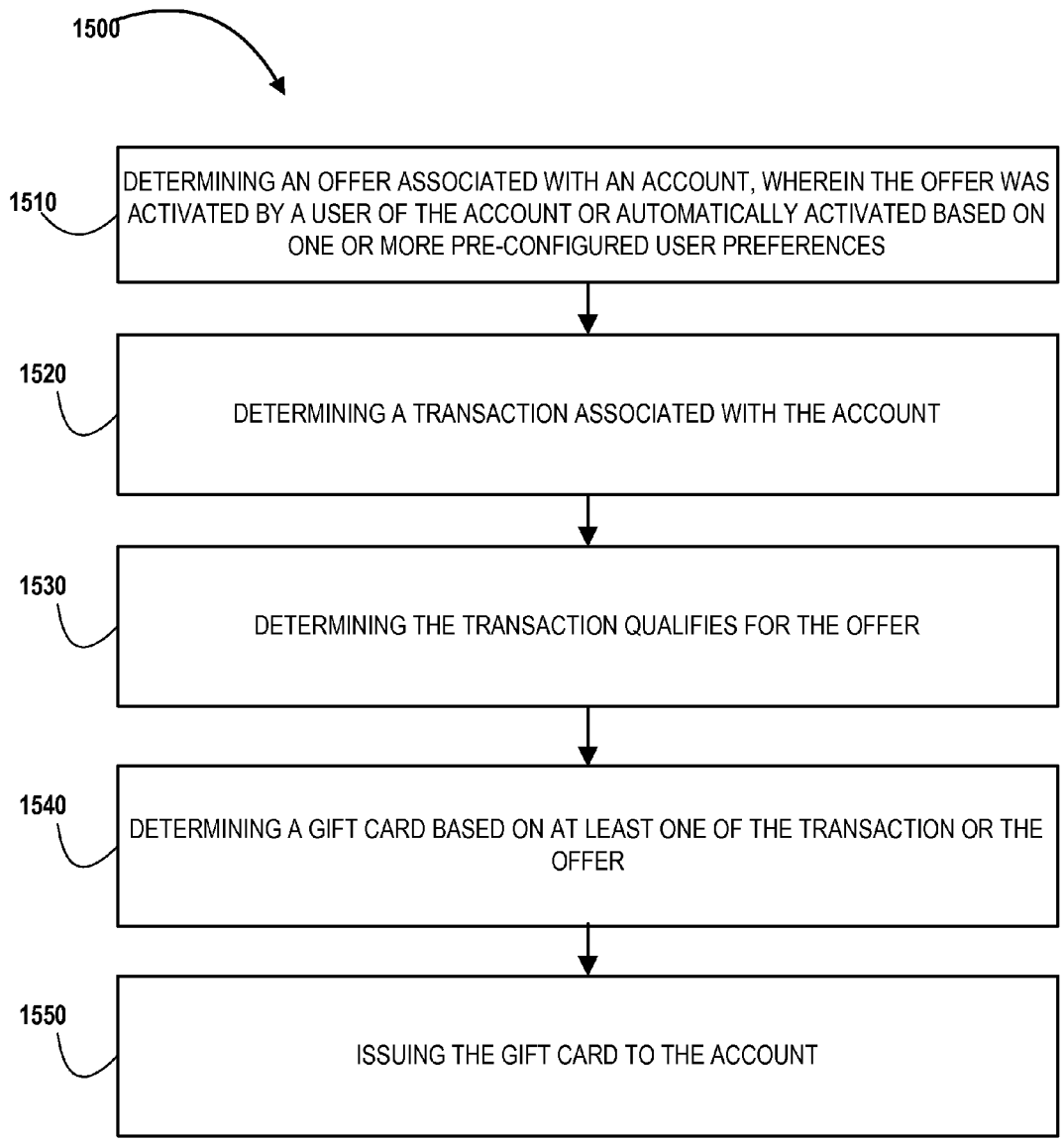
Figure 16:
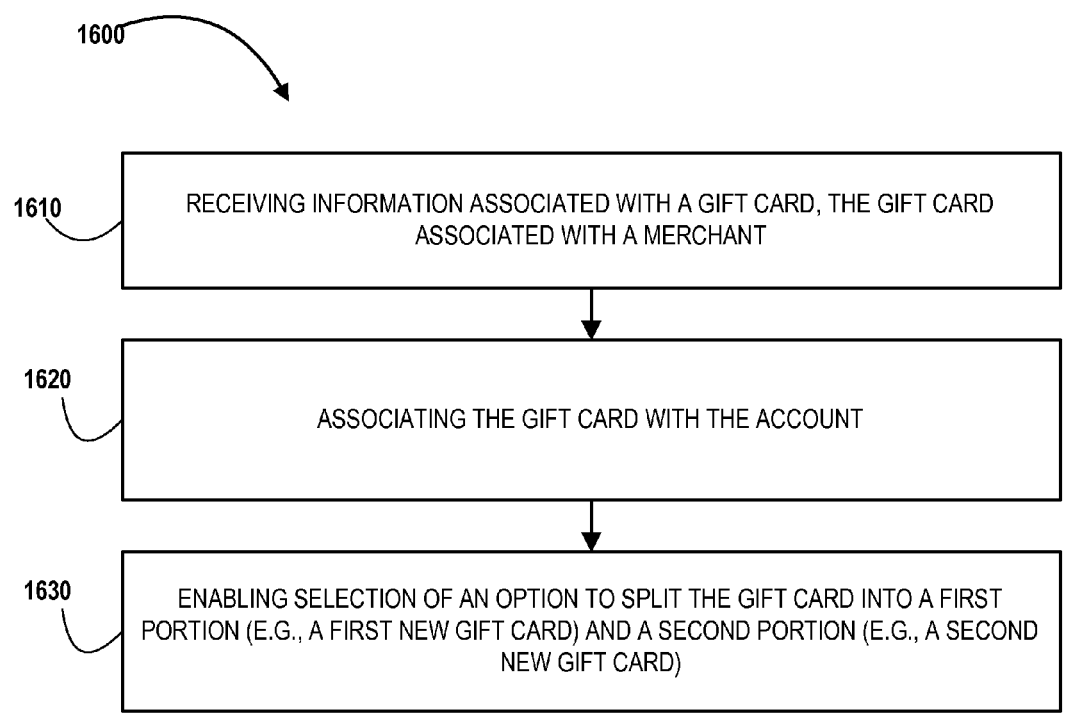
Figure 17:
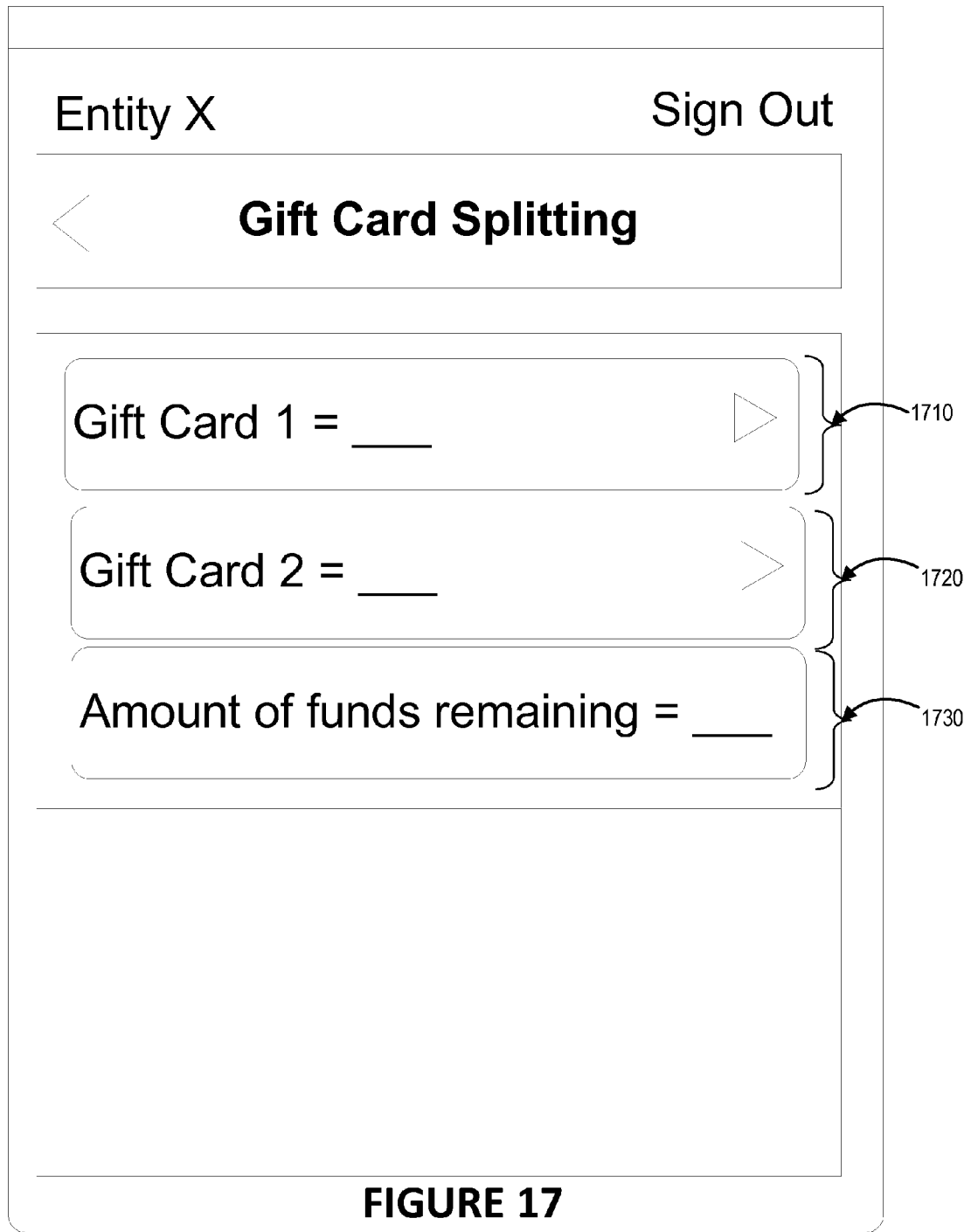
Figure 18:
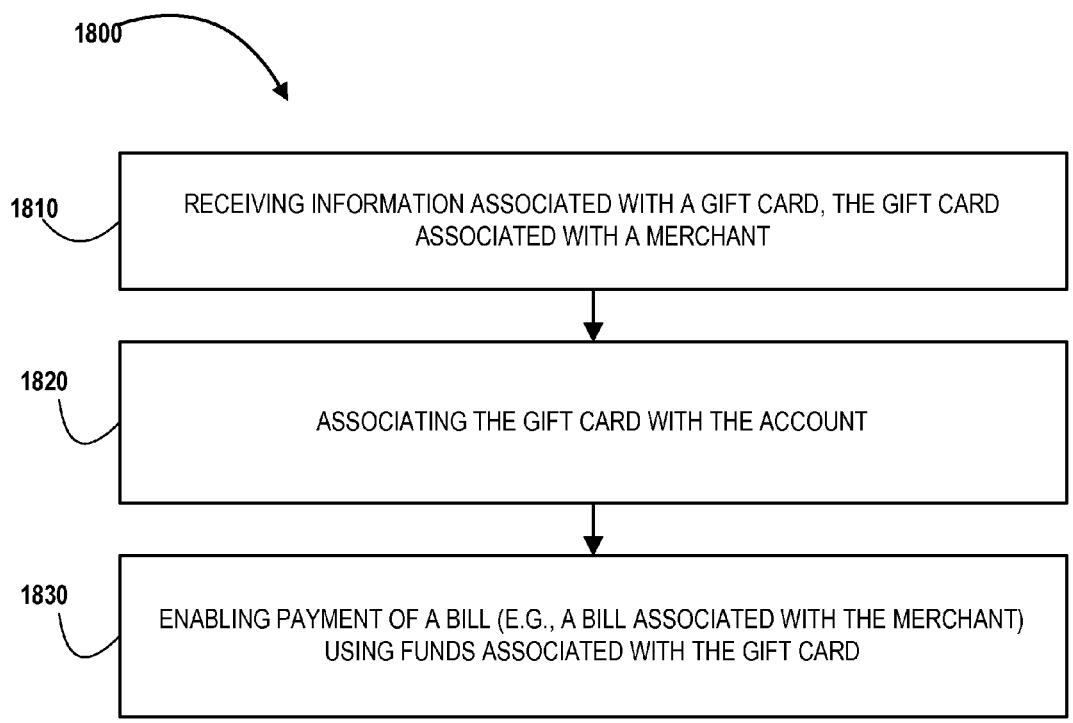
Figure 19:
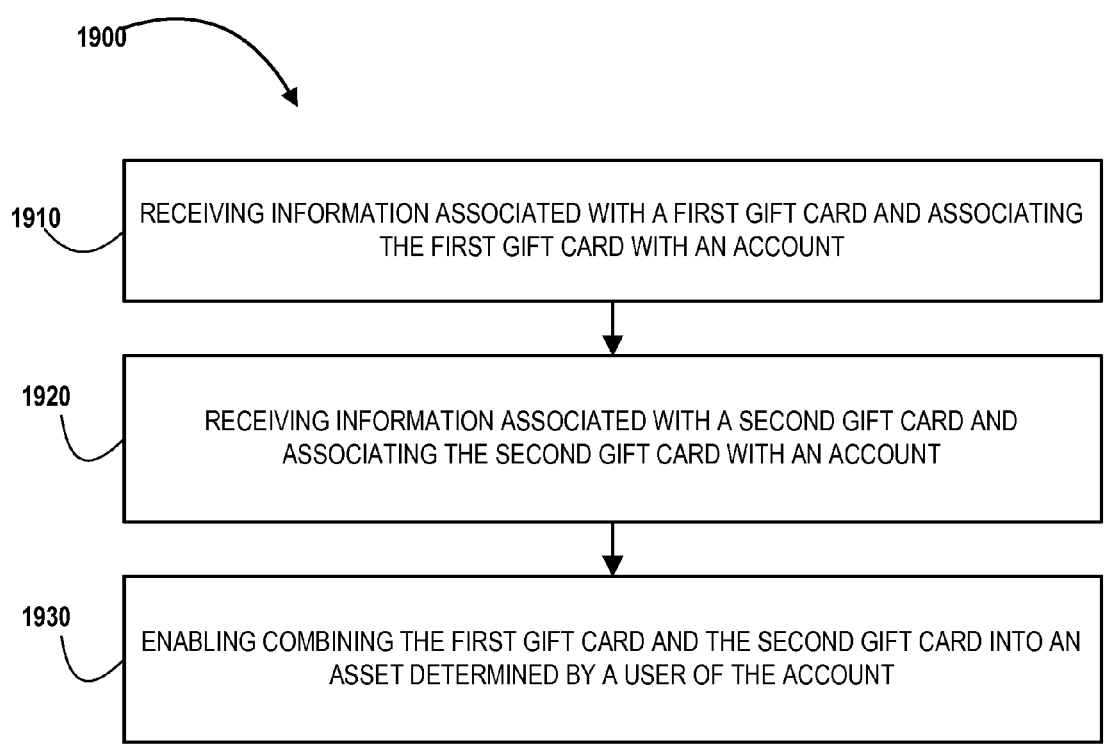
Figure 20:
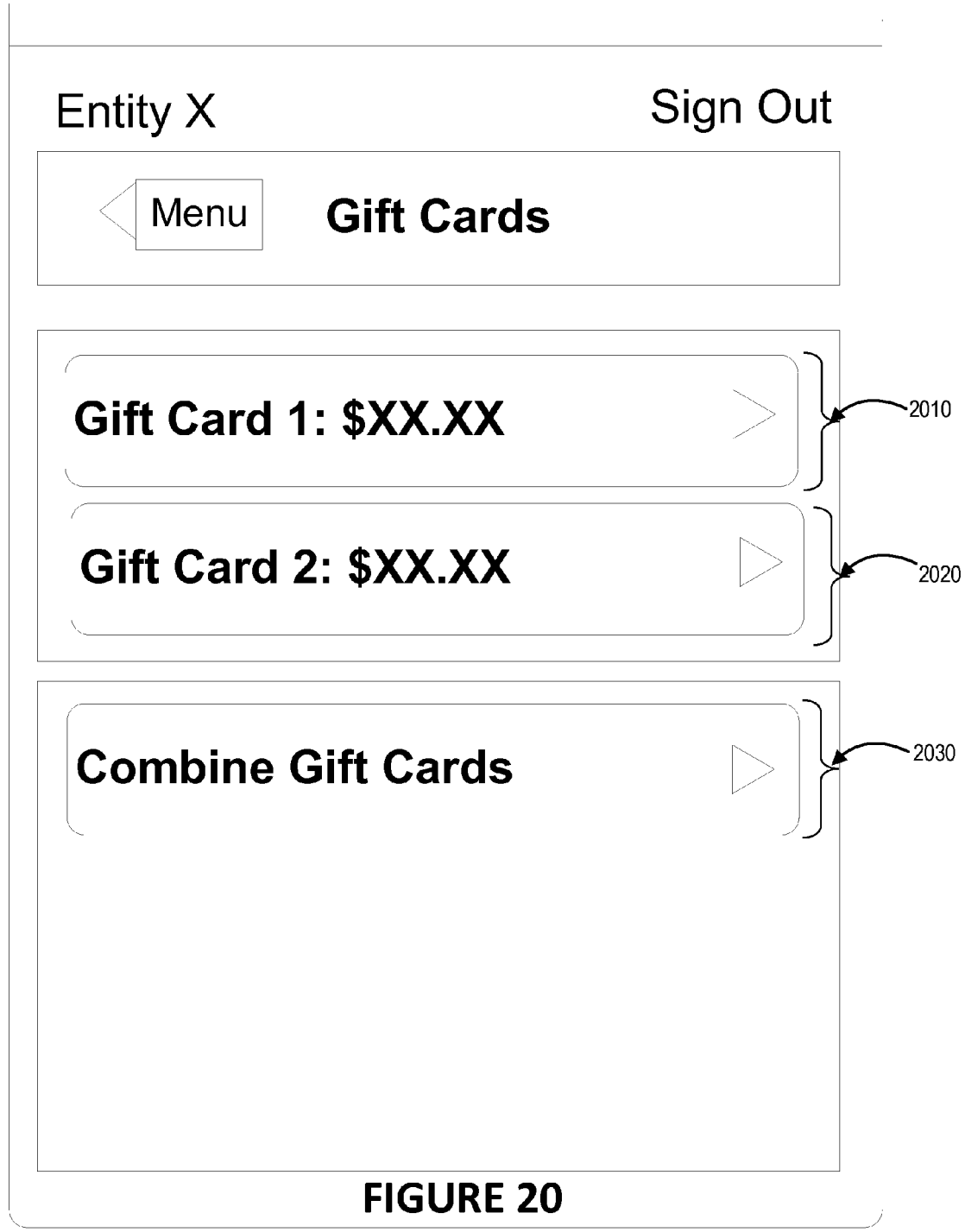
Figure 21:
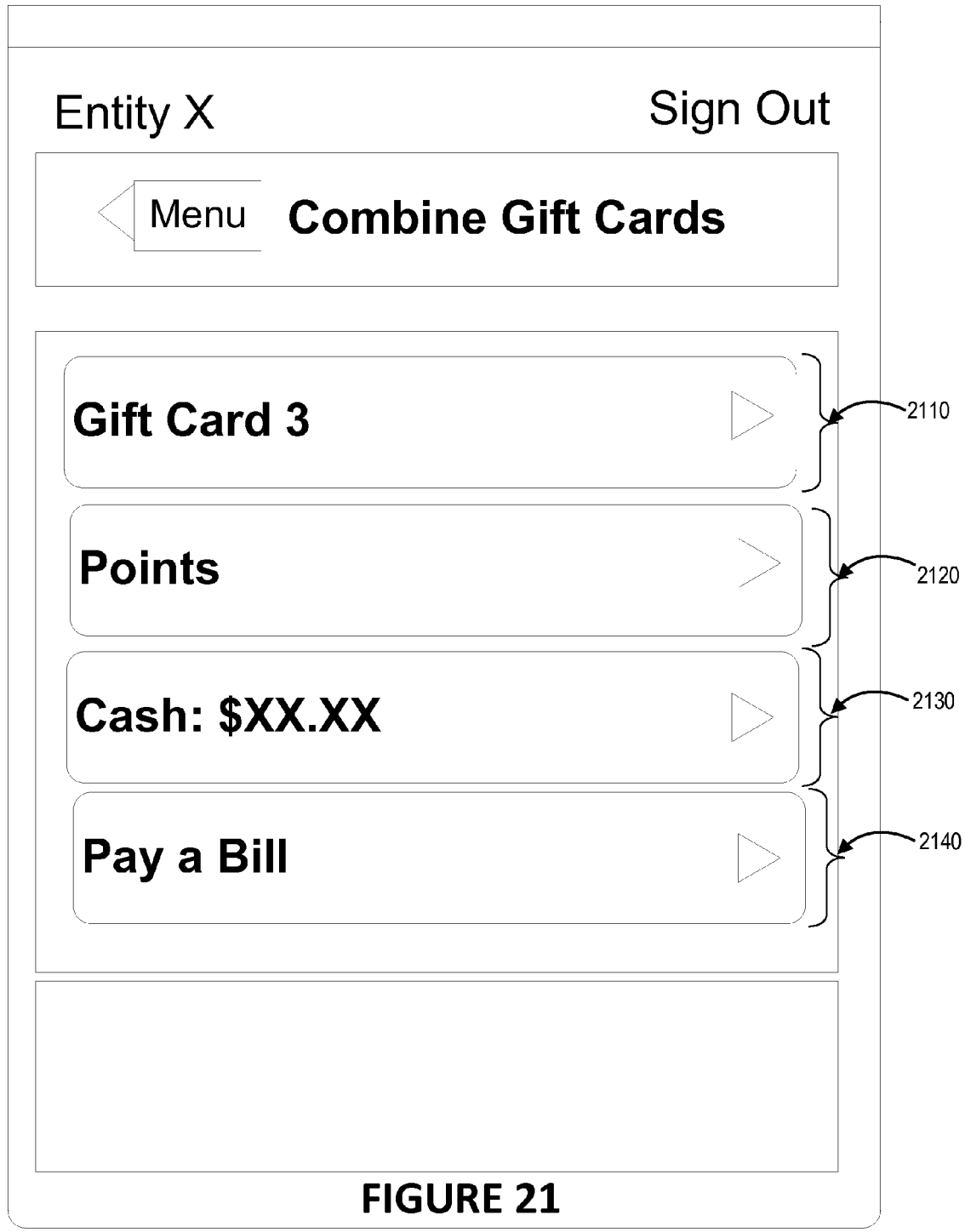
Figure 22:
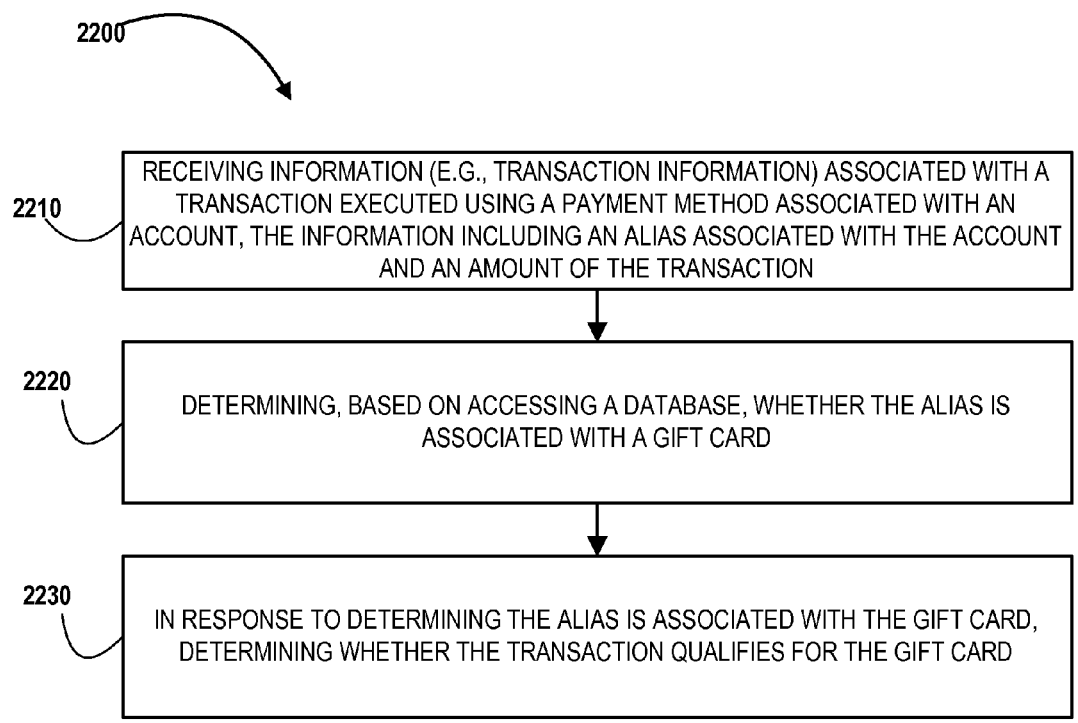
Figure 23:
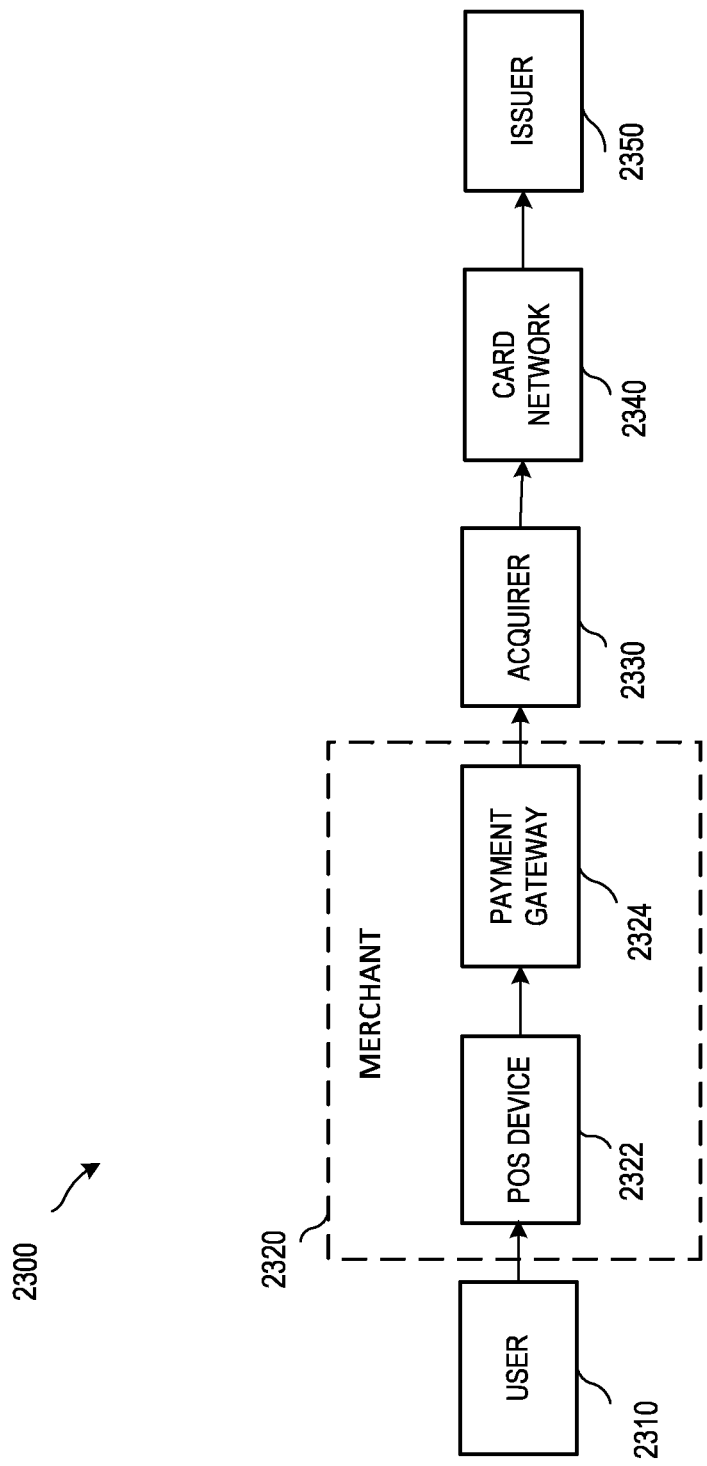
Figure 24:
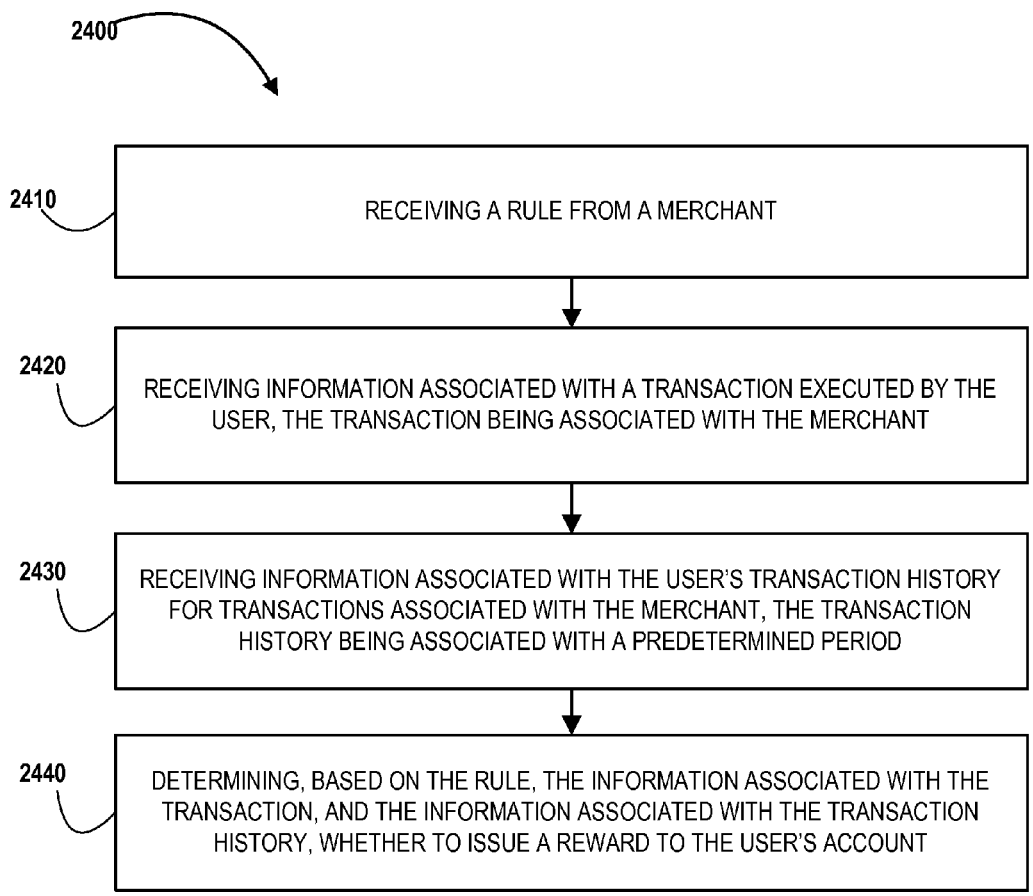
Figure 25:
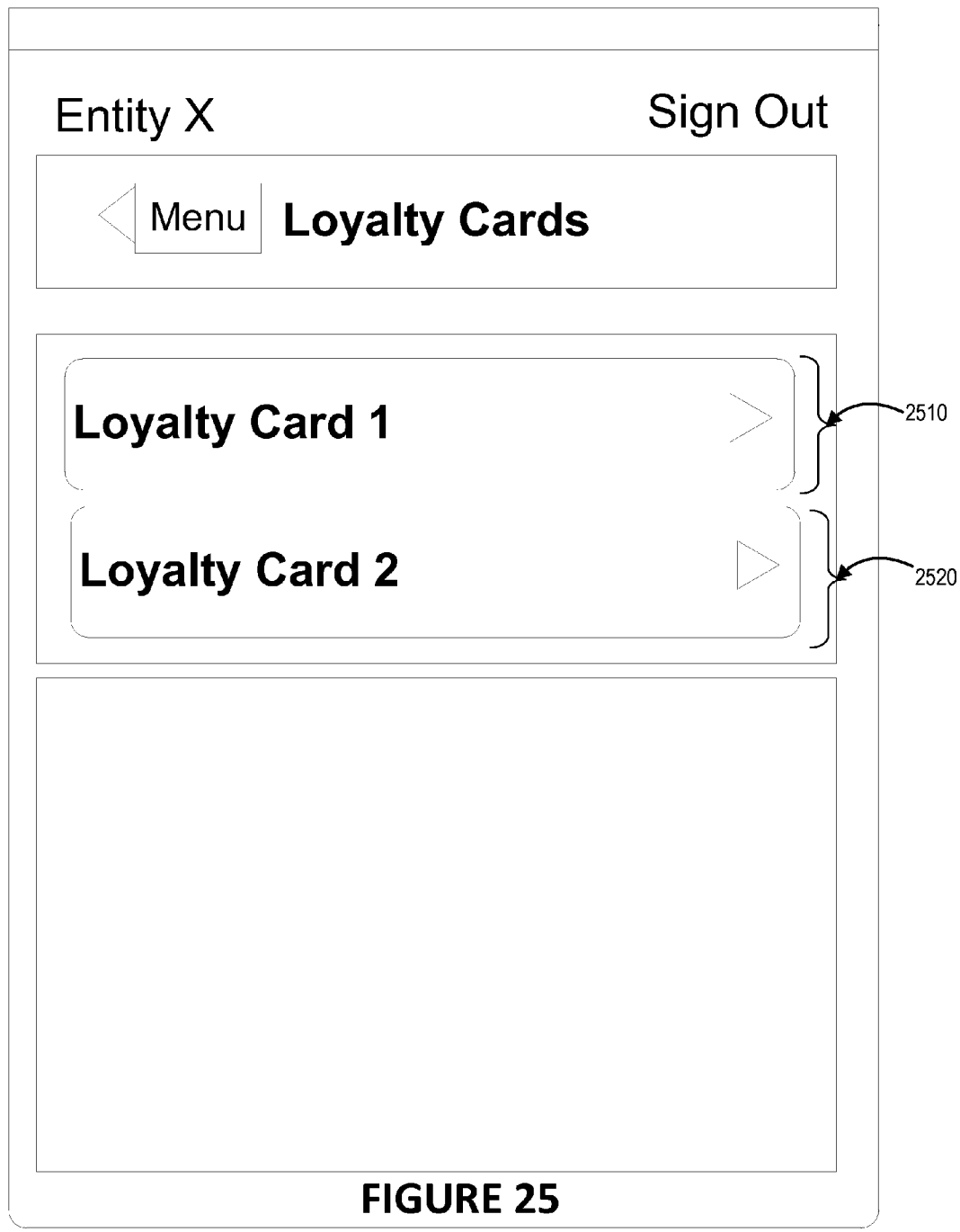
Figure 26:
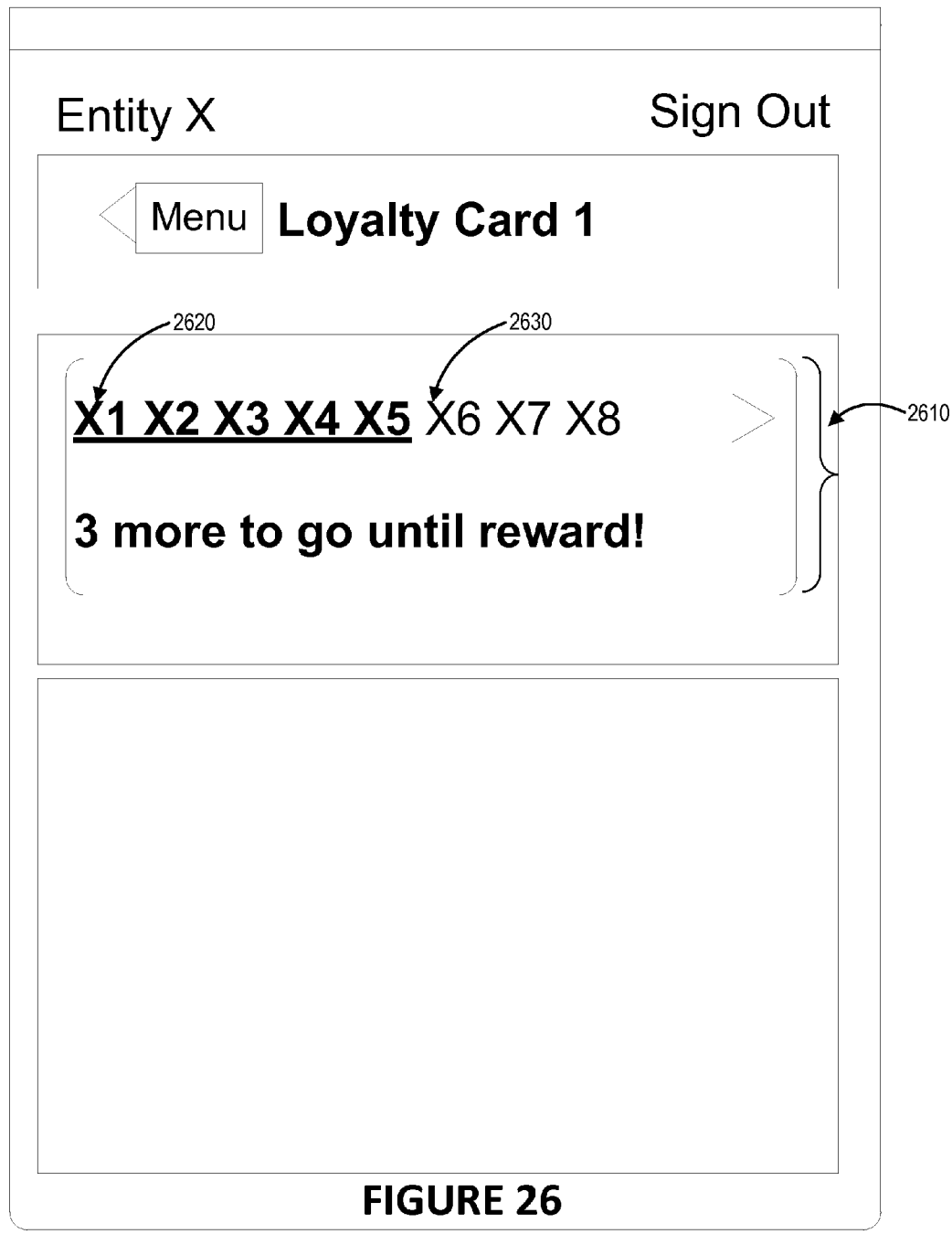

Having thus described embodiments of the invention in general terms, reference will now be made to the accompanying drawings, where:

FIG. 1 is a flowchart illustrating a general process flow for implementing gift card association, in accordance with embodiments of the present invention;

FIG. 2 is a block diagram illustrating technical components of a system for implementing the various processes described herein, in accordance with embodiments of the present invention;

FIGS. 3-7 are exemplary user interfaces for implementing gift card association, in accordance with embodiments of the present invention;

FIG. 8 is a flowchart illustrating a general process flow for implementing gift card redemption, in accordance with embodiments of the present invention;

FIG. 9 is another flowchart illustrating a general process flow for implementing gift card redemption, in accordance with embodiments of the present invention;

FIG. 10 is another flowchart illustrating a general process flow for enabling a user to customize gift card application to a transaction, in accordance with embodiments of the present invention;

FIGS. 11-12 are exemplary user interfaces for enabling a user to customize gift card application to a transaction, in accordance with embodiments FIG. 13 is a flowchart illustrating a general process flow for transmitting information to an entity (e.g., a merchant) after associating a gift card with an account, in accordance with embodiments of the present invention;

FIG. 14 is a flowchart illustrating a general process flow for determining an offer based on the gift card, in accordance with embodiments of the present invention;

FIG. 15 is a flowchart illustrating a general process flow for issuing a rebate as a gift card, in accordance with embodiments of the present invention;

FIG. 16 is a flowchart illustrating a general process flow for splitting a gift card, in accordance with embodiments of the present invention;

FIG. 17 is a user interface for splitting a gift card, in accordance with embodiments of the present invention;

FIG. 18 is a flowchart illustrating a general process flow for enabling bill payment using a gift card, in accordance with embodiments of the present invention;

FIG. 19 is a flowchart illustrating a general process flow for enabling gift card combination, in accordance with embodiments of the present invention;

FIGS. 20-21 are exemplary user interfaces for enabling gift card combination, in accordance with embodiments of the present invention;

FIG. 22 is a flowchart illustrating a general process flow for processing a transaction, in accordance with embodiments of the present invention;

FIG. 23 is an exemplary block diagram providing an overview of system and environment for making a payment, in accordance with embodiments of the present invention;

FIG. 24 is a flowchart illustrating a general process flow for applying loyalty rules, in accordance with embodiments of the present invention;

FIGS. 25-26 are exemplary user interfaces for applying loyalty rules, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for implementing gift card association. An exemplary system is configured to receive information associated with a gift card, associate the gift card with the account, receive information associated with a transaction, determine the transaction qualifies for the gift card, and apply funds associated with the gift card to the transaction. Therefore, the present invention enables a user to associate a gift card with a user's account (e.g., a financial institution account). The invention enables the user to efficiently use the funds associated with a gift card. Additionally, the invention enables a user to utilize funds associated with multiple gift cards using a single payment method (e.g., an electronic or physical payment card associated with the user's account).

In some embodiments, an "entity" or "organization" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. The entity may manage the system described herein. An "account" may be the relationship that the user has with the entity. Examples of accounts include a deposit account, such as a transactional account (e.g., a banking account), a savings account, an investment account, a money market account, a time deposit, a demand deposit, a pre-paid account, a debit account, a credit account, a non-monetary user profile that includes only personal information associated with the user, or the like. The account is associated with and/or maintained by the entity. In other embodiments, an entity may not be a financial institution. In still other embodiments, the entity may be the merchant (e.g., the merchant that issued the gift card).

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded, or the like). Additionally, the user may receive or purchase a gift card associated with a merchant.

Referring now to FIG. 1, a general process flow 100 is provided for implementing gift card association. At block 110, the method comprises receiving information associated with a gift card. At block 120, the method comprises associating the gift card with the account (e.g., a financial institution account). At block 130, the method comprises receiving information associated with a transaction. At block 140, the method comprises determining the transaction qualifies for the gift card. At block 150, the method comprises applying funds associated with the gift card to the transaction.

The system (e.g., a system associated with the financial institution) is configured to associate funds associated with the gift card with a transaction associated with a merchant that issued the gift card. Therefore, a transaction qualifies for the gift card when the transaction is associated with a merchant that issued the gift card. Additionally, if the gift card is restricted to certain predetermined types of purchases (e.g., electronics, items over $10, or the like), then the transaction qualifies for the gift card if the transaction matches one of the predetermined types of purchases.

The gift card may or may not have an expiry date. If the gift card has an expiry date, funds associated with the gift card may not be utilized after the expiry date for any transactions executed by the user. If the system redeems the entire amount (or a partial amount) of the gift card prior to the expiry date (and prior to any transactions that qualify for the gift card), the redeemed amount of gift card funds may be available to the user even after the expiry date of the gift card. As used herein, redeeming a gift card by the system may refer to receiving funds associated with the gift card from the merchant. The redemption process is described in further detail below.

A transaction is executed by a user using a payment method associated with the account. Since the gift card has been integrated into the account, the transaction is not executed using the gift card. The payment method comprises at least one of a payment card payment, an electronic funds transfer, or a mobile device payment. The payment methods are not limited to those described herein.

Applying funds associated with the gift card to the transaction comprises determining whether an amount of the transaction is greater than an amount associated with the gift card. If the amount associated with the transaction is not greater than (e.g., less than or equal to) the amount associated with the gift card, the funds associated with the gift card are applied to the transaction. Consequently, the gift card balance is reduced. If the amount associated with the transaction is greater than the amount associated with the gift card, the funds associated with the gift card are applied to the transaction, and general funds (e.g., non-gift card funds) associated with the account are applied to the remainder of the transaction. Therefore, the gift card balance is reduced to zero. Thus, when the transaction amount is greater than the available gift card funds (or when the user wishes to pay for a transaction using both gift card funds and general funds), the present invention enables a user to execute a single payment transaction for using both gift card funds and general funds. Therefore, when the transaction amount is greater than the available gift card funds, the user does not need to execute a first transaction for using gift card funds and a second transaction for using general funds.

When a transaction qualifies for a gift card, funds associated with the gift card are applied to the transaction. Therefore, when a user views (e.g., on the on the user's account) a gift card balance immediately after the transaction, the gift card's balance is reduced. Alternatively, when a transaction qualifies for a gift card, general funds (and not gift card funds) associated with the account are applied to the transaction. Therefore, when a user views a gift card balance immediately after the transaction, the gift card's balance is not reduced, but the general funds' balance is reduced. When processing the account (e.g., settling the transaction) at a predetermined time in the future, the gift card's balance is reduced by the amount of the transaction, and the general funds' balance is increased by the amount of the transaction.

For example, an account may be associated with a $50 gift card and the user executes a $100 purchase transaction using a payment method associated with the account. As used herein, execution of a transaction may comprise authorization of a transaction. Therefore, the user authorizes $100 from the account to be applied to the transaction. Upon or during authorization of the transaction, general funds ($100) are applied to the transaction while gift card funds are not applied to the transaction. At settlement of the transaction which occurs a predetermined period following authorization of the transaction (e.g., a few seconds, minutes, hours, or days later), $50 of gift card funds and $50 of general funds are applied to the transaction. Alternatively, during the authorization of the transaction or in near real-time following authorization of the transaction, the system authorizes $50 of gift card funds and $50 of general funds to be applied to the transaction.

Receiving information associated with the gift card comprises at least one of receiving an image of the gift card, receiving readable indicia associated with the gift card, or receiving manual input associated with the gift card. Therefore, a user may capture an image of a gift card (front and/or back face of card) and upload the image to the user's account. Alternatively, a user may capture an image of an email that includes information associated with a gift card or a picture of a gift card. The system may process the image to extract various information associated with the card. Information associated with the card may include an identification code (e.g., card number) associated with the gift card, an amount of the gift card, a merchant associated with the gift card, type of purchases for which the card can and/or cannot be used, expiry date of the card, authentication credentials (e.g., personal identification PIN code) associated with the card, periodic transaction assessment associated with the card, a name of the user assigned to the gift card, types of purchases that qualify for purchases associated with the gift card, or the like. Alternatively, a user may manually input information associated with the card. Therefore, a user may access a user interface associated with the account and manually input information associated with the card.

As described previously, receiving information associated with the gift card may comprise receiving readable indicia associated with the gift card. The readable indicia may comprise any indicia, visual or non-visual, associated with the gift card (e.g., located on the gift card), where information associated with the indicia is receivable or readable (e.g., scannable) by a mobile device. The readable indicia may comprise visual indicia, e.g., a barcode, a Quick Response (QR) code, or the like. The readable indicia may comprise any one-dimensional or two-dimensional code. Therefore, the user may use a mobile device that comprises an image-capturing component (e.g., a camera) to capture the image of the readable indicia. As a further example, the readable indicia is comprised in a tag (e.g., radio frequency identification (RFID) tag, near field communication (NFC) tag, or the like) located on the card. A user may bring a mobile device in close proximity to the tag in order to receive information (e.g., readable indicia) associated with the tag. Upon receiving the readable indicia, the mobile device may prompt the user to upload the readable indicia to the user's account. The user may subsequently upload the readable indicia to the user's account.

The gift card may comprise a physical gift card (e.g., a gift card, a gift card printed on paper). Alternatively, the gift card may comprise an electronic gift card. A user may manually input information associated with the electronic gift card using the user interface associated with the user's account. Alternatively, the user's account may enable the user to directly import information associated with the electronic gift card into the user's account.

The system is configured to communicate with the merchant to redeem the gift card. The system is configured to communicate with the merchant to redeem the gift card either before or after receiving information associated with the transaction. Therefore, prior to, substantially simultaneously with, or after the transaction occurs, the system transmits information associated with the gift card (and/or information associated with the transaction) to the merchant. As an example, upon associating the gift card with the account and prior to a transaction that qualifies for the gift card, the system may transmit information associated with the gift card to the merchant, and the merchant may transmit the entire amount (or a partial amount) of funds associated with the gift card to the system. Alternatively, either substantially simultaneously with, immediately after, or a predetermined period after the transaction, the system may transmit information associated with the gift card and information associated with the transaction (e.g., transaction amount) to the merchant. The merchant may then transmit the amount associated with the transaction to the system. Alternatively, the system may wait until the entire amount of the gift card has been used for a transaction (or transactions) that qualifies for the gift card before communicating with the merchant to redeem the entire amount associated with the gift card.

The funds associated with the gift card may be referred to as gift card funds. The system is configured to add a predetermined amount of extra funds to the gift card funds. The system may be configured to add the predetermined amount of extra funds immediately after the user integrates the gift card into the account, or a predetermined period after the user integrates the gift card into the account. This may serve as an incentive to the user to utilize the invention described herein.

The user may associate multiple gift cards with the user's account. The system may enable the user to organize the multiple gift cards. For example, the system may enable the user to group gift cards associated with a certain type (e.g., home furnishings), a certain location (e.g., a certain mall, zip code, or the like), a certain amount, a certain expiry date, a user associated with the gift card, or the like. For example, an account may be a joint account associated with a husband and a wife. The husband may upload a first gift card and select an option on the account user interface to associate the first gift card with transactions executed by at least one of the husband or the wife. The wife may upload a second gift card and select an option on the account user interface to associate the second gift card with transactions executed by at least one of the husband or the wife.

As used herein, the account may be a financial institution account. Alternatively, the account may be a social networking account. Alternatively, the account may be a merchant account associated with the user. A merchant account is an account established by the user associated with the merchant (e.g., a user account established on the merchant's website).

The transaction associated with the gift card may be processed (e.g., by a financial institution) as a debit or credit transaction or similar to a debit or credit transaction. Therefore, the gift card transaction is essentially a debit or credit transaction. For example, when the user makes a purchase for $150, and uses a $50 gift card to pay part of the transaction and uses the user's credit card to pay the remainder of the transaction, the entire transaction may be processed as a $150 credit (or debit) transaction. The gift card funds may be held in a gift card account (or pseudo gift card account) that is associated with an account (e.g., a financial institution account) that holds the general funds described herein.

The user may associate multiple gift cards (e.g., a first gift card, a second gift card, or the like) with an account. Each gift card may be associated with its own pseudo gift card account. Therefore, both the first and second gift cards may qualify to be applied to a transaction. When both the first and second gift cards qualify to be applied to a transaction, an entire amount of the first gift card is first applied to the transaction, and the second gift card (followed by general funds) are applied to the remainder of the transaction. Either prior to or during the transaction, the user may select the first gift card to be applied to the transaction (e.g., using the user's mobile device). Alternatively, the system may have pre-configured rules for applying gift cards to the transaction. For example, a gift card associated with a smaller amount (or associated with an earlier expiration date) may be applied to the transaction before a gift card associated with a larger amount (or associated with a later expiration date).

Either prior to or during the transaction, the user may activate or deactivate a gift card. For example, prior to a transaction, the user may deactivate a gift card using the user's mobile device. If the gift card is deactivated, general funds associated with a user's account are applied to the user's transaction even though the transaction may qualify for the gift card. As a further example, if the user is executing a transaction using a mobile device, the mobile device user interface may prompt a user interface to pay for the transaction using at least one of funds associated with the gift card or general funds associated with the account. Therefore, the user may select the amount to the paid using the gift card and the amount to be paid using general funds. The user may select to pay the entire amount of the transaction using the gift card or using general funds.

The gift card may comprise a rebate issued by the merchant. For example, instead of issuing a rebate to an account of the user (e.g., when the user executes a transaction associated with an offer), a merchant may issue a gift card to the user's account. The gift card may be an electronic or digital gift card, and may be uploaded to the system described herein.

Referring now to FIG. 2, FIG. 2 presents an exemplary block diagram of the system environment 200 for implementing any of the process flows described herein, in accordance with embodiments of the present invention. As illustrated, the system environment 200 includes a network 210, a system 230, and a user input system 240. Also shown in FIG. 2 is a user 245 of the user input system 240. The user input system 240 may be a mobile device (e.g., a portable mobile communication device) described herein. The user 245 may be a person (e.g., an account holder) who uses the user input system 240 to execute a user application 247. The system 230 may be the external server described herein. The user application 247 and/or the system application 237 may incorporate one or more parts of the process flow 100 or any other function described herein. The user 245 may use the user input system 240 to upload information associated with a gift card to the user's account. The system 230 may process information associated with the gift card, associate the gift card with the user's account, process transactions associated with the account, or the like.

As shown in FIG. 2, the system 230, and the user input system 240 are each operatively and selectively connected to the network 210, which may include one or more separate networks. In addition, the network 210 may include a local area network (LAN), a wide area network (WAN), and/or a global area network (GAN), such as the Internet. The network may also include a mobile telecommunication network. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a network device, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be an external server as described herein. The system may be associated with (e.g., managed by) at least one of a financial institution, a merchant, any other entity that may not be associated with the financial institution or the merchant, an acquirer, an issuer, a card network entity, a user of an account, or the like. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of any process flow described herein. Additionally, the system 230 is configured to initiate presentation of any of the user interfaces described herein.

Figure 5:
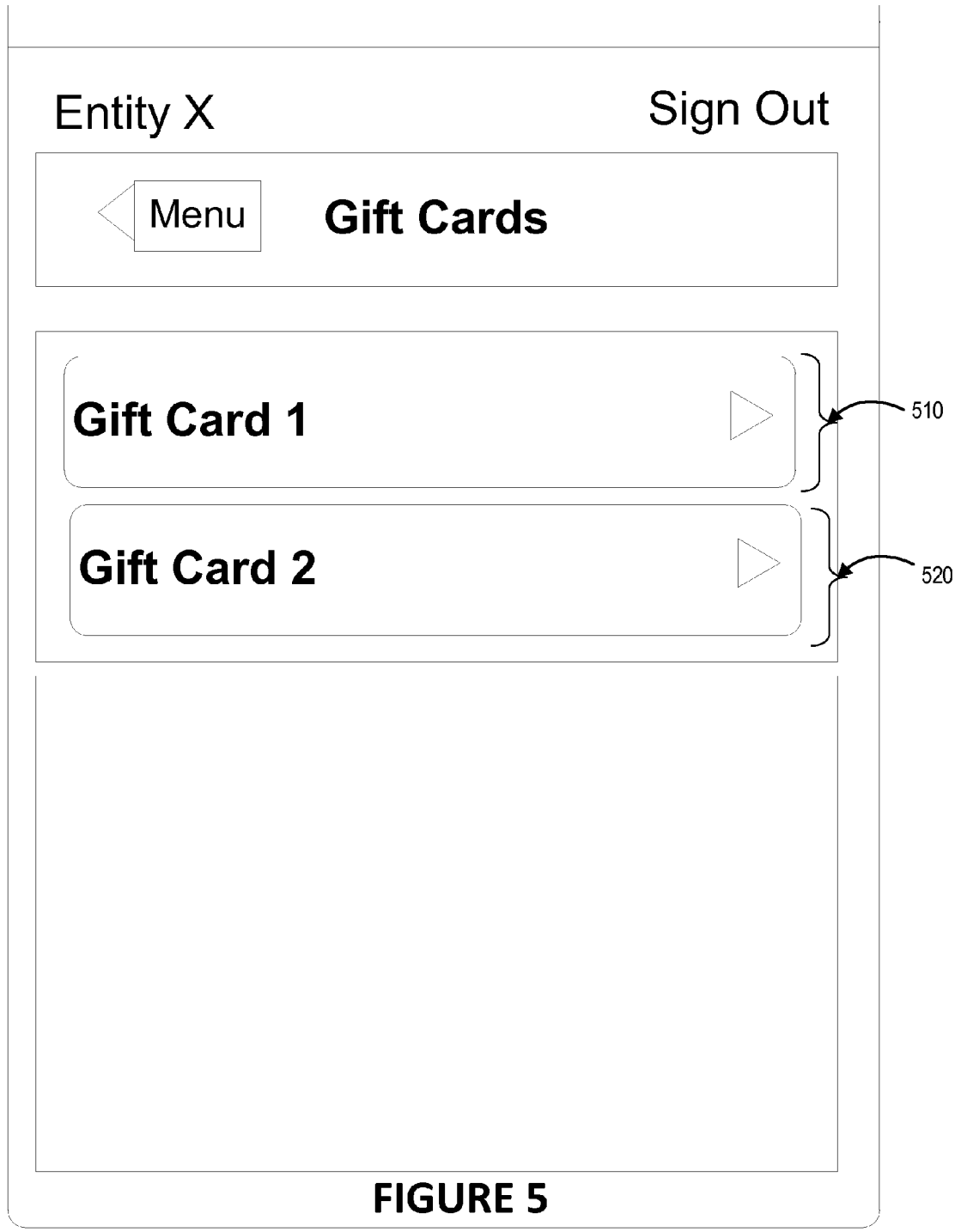
Figure 6:
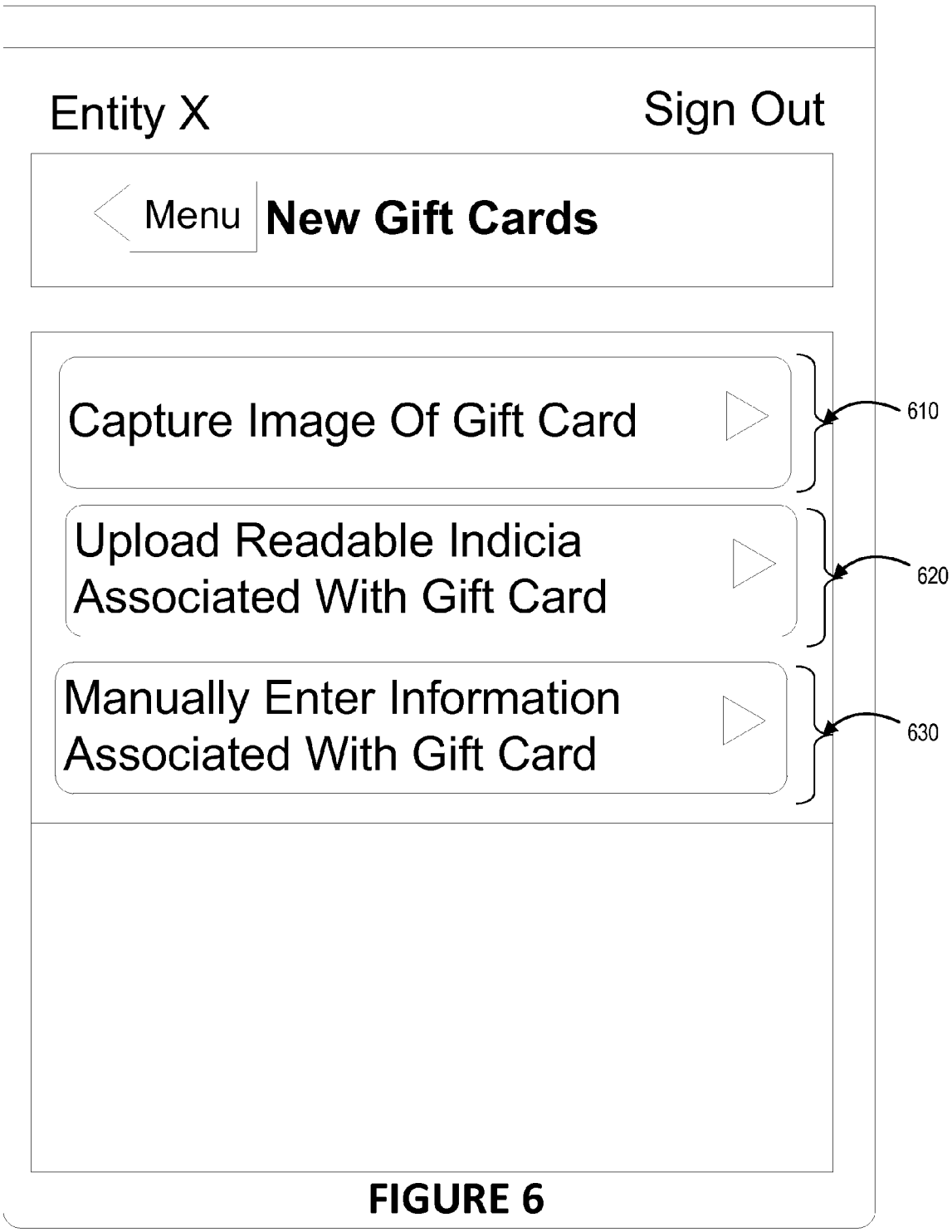
Figure 7:
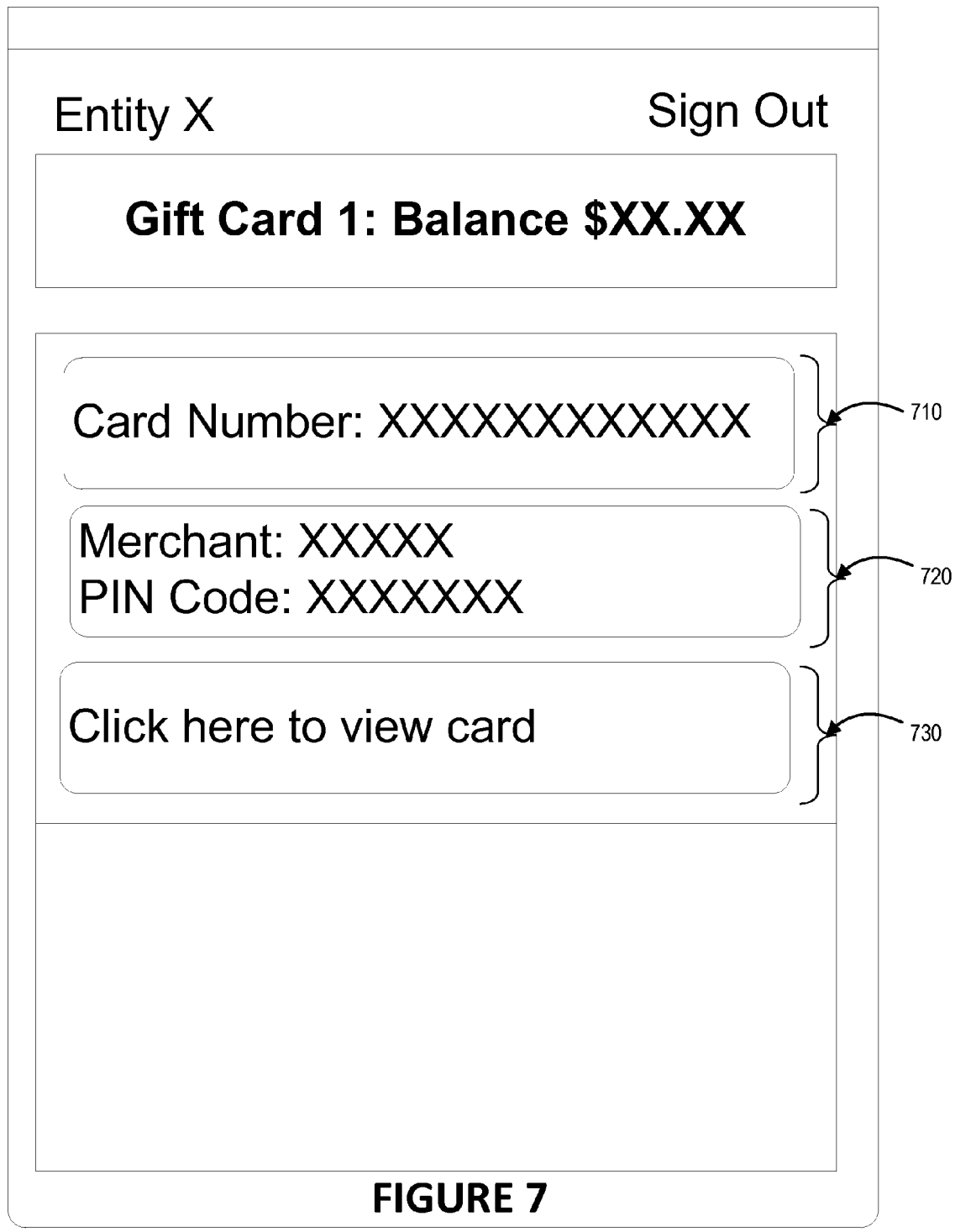

Referring now to FIGS. 3-7, FIGS. 3-7 are exemplary user interfaces for implementing gift card association, in accordance with embodiments of the present invention. A user may authenticate to the user's account. When the user authenticates to the user's account, the user is transported to the user interface presented in FIG. 3. The user interface comprises links to the user's savings/checking account 310 (e.g., general funds) and the user's gift cards 320. When the user selects the gift cards option, the user is transported to the user interface presented in FIG. 4. The user interface enables the user view gift cards 410 or upload a new gift card 420. When the user selects the option to view gift cards 410, the user is transported to the user interface presented in FIG. 5. The user interface in FIG. 5 presents a first gift card 510 and a second gift card 520. When the user selects the option to upload a new gift card 420 in FIG. 4, the user is transported to a user interface for uploading new gift cards. On this user interface (visible in FIG. 6), the user is presented with options to capture an image of a gift card 610, upload readable indicia associated with a gift card 620, or manually enter information associated with a gift card 630. When the user selects the first gift card 510 in FIG. 5, the user is transported to the user interface presented in FIG. 7. FIG. 7 indicates the balance associated with the first gift card. Additionally, the user interface presents the card number 710, the merchant 720 associated with the gift card, and the PIN code 720 associated with the gift card. Additionally, the user interface presents an option 730 for the user to view an image of the card. This option is presented when the image of the card is uploaded to the system.

Referring now to FIG. 8, a general process flow 800 is provided for redeeming a gift card. At block 810, the method comprises receiving information associated with a gift card, the gift card associated with a merchant. At block 820, the method comprises associating the gift card with the account (e.g., a financial institution account). At block 830, the method comprises transmitting a redemption request to an entity, the redemption request for redeeming funds associated with the gift card. At block 840, the method comprises receiving funds associated with the gift card from the entity (e.g., based on selling the gift card to the entity). Funds associated with the gift card may comprise credit, debit, or the like. As used herein, receiving funds associated with the gift card enables the system to provide a credit associated with the received amount to the user. This credit is visible to the user as the amount associated with the gift card (may also be referred to as gift card funds). In alternate embodiments, the system is configured to display the amount associated with the gift card to the user without transmitting a redemption request to the entity and/or receiving funds from the merchant. The entity may comprise the merchant associated with the gift card or may comprise some other entity not associated with the merchant.

A financial institution may redeem the funds associated with the gift card immediately upon associating the gift with a financial institution account so that the financial institution benefits from increased deposited funds. Additionally, the financial institution may immediately redeem the funds associated with the gift card so that the financial institution does not have to communicate with a merchant after a user executes a transaction that qualifies to be paid with funds associated with the gift card.

The redemption request may be transmitted to the entity (e.g., the merchant or some other entity) by at least one of the user or the financial institution that manages the system described herein. The user or the financial institution may determine whether to and when to transmit the redemption request to the entity for redeeming the gift card.

The system may be configured to transmit the redemption request to the merchant upon (e.g., immediately upon) or a predetermined period after associating the gift card with the account. The request may be for an entire amount of funds associated with a gift card, or for a partial amount of funds associated with the gift card. The amount of funds received by the system from the merchant may be at least one of less than, equal to, or greater than the amount requested in the redemption request (and/or the amount of the gift card). Therefore, upon associating the gift card with the account and prior to a transaction that qualifies for the gift card, the system may transmit a redemption request to the merchant, and the merchant may respond by transmitting the entire amount (or a partial amount) associated with the gift card to the system.

The redemption request may be transmitted via at least one of a wired or wireless network. The merchant may accept or reject the redemption request. If the merchant rejects the redemption request, the merchant does not transmit any funds to the system. If the merchant accepts the redemption request, the merchant transmits at least one of an entire or partial amount of the funds requested in the redemption request. There may be a predetermined period between the merchant's receipt of the redemption request and the merchant's transmission of the funds associated with the gift card to the system.

The redemption request may comprise information associated with the gift card as described herein. Additionally, the redemption request may comprise information associated with the user, information associated with the account, or the like. Information associated with the user may comprise a name of the user, contact information of the user, or the like. Information associated with the account may comprise transaction history (e.g., transactions associated with the merchant).

In some embodiments, the system may be configured to transmit the redemption request to the merchant substantially simultaneously with (e.g., in real-time or near real-time), immediately after, or a predetermined period after receiving information associated with a transaction that qualifies for the gift card. The redemption request may comprise information associated with the user, information associated with the account, information associated with the transaction, or the like. Information associated with the transaction may comprise an amount of the transaction, address of where the transaction occurred, items purchased, date and/or time of transaction, payment method used for the transaction, or the like. The merchant may then transmit the amount associated with the transaction to the system. Alternatively, the system may wait until the entire amount of the gift card has been used for a transaction (or transactions) that qualifies for the gift card before transmitting a redemption request to the merchant.

Therefore, gift card funds (e.g., an entire amount or less than an entire amount of the gift card funds) may be redeemed upon associating the gift card with the account, or the gift card funds associated with each transaction may be redeemed upon execution of each transaction that qualifies for the gift card funds. The merchant may benefit if the gift card funds are redeemed because a transaction associated with redeemed gift card funds is a transaction associated with the system or the financial institution described herein (and may not involve the merchant). Therefore, the merchant may not need to track or monitor the gift card funds after the funds are redeemed by the system described herein.

The gift card funds may be available for use by the user (e.g., the funds may be applied to a qualifying transaction executed by the user) at least one of prior to or after redemption of the gift card funds (e.g., transmitting the redemption request to the merchant and/or redeeming funds associated with the gift card from the merchant). For example, if the user executes a transaction that qualifies for the gift card prior to the redemption of the funds, the transaction may be paid using gift card funds. Alternatively, if the user executes a transaction that qualifies for the gift card prior to the redemption of the funds, the transaction may be paid using general funds associated with the account. As a further example, if the user executes a transaction that qualifies for the gift card after redemption of the funds, the transaction may be paid using gift card funds.

Once the gift card funds are redeemed by the system, the gift card funds may be managed separately from general funds associated with the account. Therefore, the gift card funds may be presented separately from the general funds on a user interface associated with the account. As described herein, the gift card funds may be used for qualifying transactions. Alternatively, when the gift card funds are redeemed by the system, the gift card funds are merged with the general funds associated with the account. If the gift card funds are merged with the general funds, the user may use gift card funds for any transaction, regardless of whether or not the transaction qualifies for the gift card. In some embodiments, even when the gift card funds are managed separately from the general funds, the gift card funds may be used as general funds for any transaction (and not limited to just qualifying transactions).

Referring now to FIG. 9, a general process flow 900 is provided for redeeming a gift card. At block 910, the method comprises receiving information associated with a gift card, the gift card associated with a merchant. At block 920, the method comprises associating the gift card with the account (e.g., a financial institution account). At block 930, the method comprises transmitting a redemption request to an entity, the redemption request for redeeming funds associated with the gift card. At block 940, the method comprises receiving funds associated with the gift card from the entity. The funds may not be restricted to purchases associated with the merchant. Therefore, the present invention enables the system to receive funds associated with the gift card from the merchant (e.g., based on selling the gift card to the entity). Funds associated with the gift card may comprise credit, debit, or the like. As used herein, receiving funds associated with the gift card enables the system to provide a credit associated with the received amount to the user. This credit is visible to the user as the amount associated with the gift card (may also be referred to as gift card funds). In alternate embodiments, the system is configured to display the amount associated with the gift card to the user without transmitting a redemption request to the entity and/or receiving funds from the merchant. Funds associated with the gift card may comprise credit, debit, or the like. The features associated with process flow 800 may be applicable to process flow 900, and vice versa.

As described herein, the system associated with the financial institution redeems the gift card amount (or an amount less than or greater than the gift card amount) from the merchant (or some other third-party entity as described below). Upon (e.g., immediately upon or a predetermined period after) associating the gift card with the account, the system may transmit an offer to the user enabling the user to accept whether to redeem an amount associated with the gift card such that the redeemed amount may be used as general funds. Therefore, the funds may not be restricted or limited to purchases associated with the merchant. The offer may be transmitted via at least one of email, text or multimedia message, social network message, financial network message, or the like. The amount may be at least one of less than, equal to, or greater than the gift card amount (e.g., the face value of the gift card). For example, for a $25 gift card, the system may present an offer to redeem the gift card for $24. The message transmitted to the user may present selectable options enabling the user to either accept or reject the offer. If the user accepts the offer, the system transmits the redemption request to the merchant. If the user rejects the offer, the system does not transmit the redemption request to the merchant. The message may additionally present an assessment to the user for redeeming the gift card amount (e.g. $1). The invention is advantageous to the merchant because by redeeming the gift card, the merchant can keep track of gift cards associated with the merchant.

Alternatively, the message may enable the user to choose between redeeming the gift card with the merchant or redeeming the gift card with a different third-party entity. In some embodiments, the system may determine how to redeem the gift card without presenting the user with options regarding how to redeem the gift card. Therefore, in some embodiments, the system may transmit the redemption request described herein to a third-party entity, rather than the merchant associated with the gift card. The third-party entity may transmit an entire amount (or less than or greater than the entire amount) requested in the redemption request. The funds requested in the redemption request may be less than, equal to, or greater than the gift card amount. As used herein, a merchant that issued a gift card may refer to a merchant associated with the gift card, regardless of whether the merchant (or some other third-party entity) issued the gift card.

As a customer of an entity (e.g., a financial institution) associated with the system described herein, the user may eligible for one or more rewards. A reward may be the redemption of funds associated with the user's gift card. Therefore, the system may redeem the gift card as a reward to the user.

In other embodiments, the user may select an option to redeem the gift card funds as reward points or loyalty points. The system may access a formula to convert the gift card funds to reward points (e.g., one gift card dollar equals ten reward points). The user may then redeem the reward points for one or more rewards. In some embodiments, the reward points are restricted to rewards associated with the merchant associated with the gift card. In other embodiments, the reward points may be redeemed for rewards associated with any merchant and not just the merchant associated with the gift card.

Referring now to FIG. 10, a general process flow 1000 is provided for enabling a user to customize gift card application to a transaction. The process flow may be executed by a system described herein. At block 1010, the method comprises receiving information associated with a gift card, the gift card associated with a merchant. At block 1020, the method comprises associating the gift card with the account (e.g., a financial institution account). At block 1030, the method comprises determining the transaction qualifies for the gift card. At block 1040, the method comprises determining whether a user has selected a first option to apply funds associated with the gift card to the transaction or a second option to apply general funds associated with the account to the transaction. Therefore, the present invention enables a user to determine whether to apply gift card funds or general funds (e.g., non-gift card funds) to a transaction. The first option, the second option, and the third option (described below) may be presented on a user's computing device (e.g., mobile computing device). The system described herein receives the user's selection either prior to, during (e.g., substantially simultaneously with), or after the transaction is executed. Therefore, funds are applied to the transaction based on the user's selection.

As used herein, execution of a transaction may comprise authorization of the transaction. Therefore, in order to reconfigure funds applied to a transaction after a transaction is executed, the user's selection is received after authorization of the transaction, but before settlement of the transaction. In some embodiments, a user may not be able to reconfigure funds applied to a transaction after settlement of the transaction.

The first option and the second option may be associated with activating and deactivating the gift card. Therefore, when the first option is selected (e.g., on a user's computing device), the gift card is activated, and when the second option is selected, the gift card is deactivated. When the gift card is activated, gift card funds are applied to a transaction that qualifies for the gift card. When the gift card is deactivated, general funds, and not gift card funds, are applied to a transaction that qualifies for the gift card. When the gift card is deactivated, the gift card may be automatically reactivated following the next transaction that qualifies for the gift card (or following the duration of deactivation selected by the user, or following a selected number of transactions that qualify for the gift card, or the like). Alternatively, the gift card may need to be manually reactivated by the user. In alternate embodiments, activation and deactivation options may be provided independently of the first and second options described herein (e.g., selection of the first and/or second option does not activate and/or deactivate a gift card).

Additionally, the system initiates presentation of a third option to apply the funds associated with the gift card to a first portion (e.g., percentage amount, absolute amount, or the like) of the transaction and the general funds associated with the account to a second portion (e.g., percentage amount, absolute amount, or the like) of the transaction. The user may specify these amounts either prior to, during, or after the transaction. Therefore, when the system presents three options, the system receives selection of at least one of the first option, the second option, or the third option.

The system is configured to receive selection of the first option, the second option, or the third option (and settings associated with the each options) at least one of prior to, substantially simultaneously with, or after a user executes the transaction. For example, a setting associated with the third option is the percentage amount of the transaction to be paid or satisfied using gift card funds and the percentage amount of the transaction to be paid or satisfied using general funds.

For example, prior to the transaction, the user may use a computing device (e.g., the user's mobile device) to specify that the next transaction that qualifies for the gift card (or next predetermined number of transactions or transactions executed during a predetermined duration) is to be satisfied or paid using general funds and not using gift card funds. Therefore, when the user executes the transaction, the transaction is satisfied or paid using general funds, and not using gift card funds, even though the transaction qualifies to be satisfied or paid using gift card funds. As a further example, during the transaction that qualifies for the gift card, upon presenting the user's mobile device for payment (e.g., payment via mobile wallet), the mobile device user interface may present at least one of the first option, the second option, or the third option described herein. As a further example, upon presenting the user's payment card (e.g., credit card, debit card, or the like) for a purchase that qualifies for the gift card, a display of the payment terminal at the merchant may present at least one of the first option, the second option, or the third option described herein.

As a further example, the transaction may be executed such that the purchase is paid or satisfied using at least one of gift card funds or general funds. Following the transaction (e.g., following authorization of the transaction, following settlement of the transaction, or the like), the user may select the executed transaction on an account interface (e.g., financial institution account interface) and reconfigure the payment of the purchase (or the funds applied to the transaction) such that the payment is made using funds selected by the user (e.g., gift card funds, general funds, or a combination of gift card funds and general funds).

The system may incent the user to use the gift card in several possible ways. An incentive may comprise at least one of increasing the amount of funds associated with the gift card, transmitting a rebate (e.g., cash back) to the user's account, transmitting a reward (e.g., reward points) to the user's account, transmitting an offer to the user's account, or the like. For example, the system may provide the incentive if the user executes a transaction at least one of: using a certain payment method (e.g., a credit transaction rather than a debit transaction), within a certain time frame, associated with a certain merchant, associated with a certain minimum or maximum transaction amount, or the like. As a further example, the system may provide the incentive if the user transmits the redemption request and/or redeems the gift card either before or after a specific date (or within a specified time frame). The system may inform the user (e.g., by transmitting a message to the user) of the incentives and how to earn the incentives upon associating the gift card with the account or a predetermined period after associating the gift card with the account. The message may be transmitted to the user via at least one of email, text or multimedia message, social network message, or financial institution network message.

Referring now to FIGS. 11-12, FIGS. 11-12 present exemplary user interfaces associated with the process described in FIG. 10. FIG. 11 illustrates the first option 1110, the second option 1120, and the third option 1130 described herein. As described herein, the user may select an option either prior to, during, or after executing a transaction that qualifies for the gift card. When the user selects the third option 1130, the user interface in FIG. 12 is presented to the user. On the user interface presented in FIG. 12, the user may define the percentage or absolute amount of gift card funds 1210 to be applied to a transaction that qualifies for the gift card, and the percentage or absolute amount of general funds 1220 to be applied to a transaction that qualifies for the gift card.

Referring now to FIG. 13, a general process flow 1300 is provided for transmitting information to an entity (e.g., a merchant) after associating a gift card with an account. The process flow may be executed by a system described herein. At block 1310, the method comprises receiving information associated with a gift card, the gift card associated with a merchant. At block 1320, the method comprises associating the gift card with an account (e.g., a financial institution account). At block 1330, the method comprises transmitting information to an entity, the information being associated with at least one of the gift card, the account, or a user associated with the account. The entity may comprise at least one of the merchant associated with the gift card or the entity (e.g., the financial institution) managing the system described herein. The present invention enables the entity (e.g., the merchant) to learn the identity of the user in possession of the gift card along with contact information of the user.

Referring now to FIG. 14, a general process flow 1400 is provided for determining an offer based on the gift card. The process flow may be executed by a system described herein. At block 1410, the method comprises receiving information associated with a gift card, the gift card associated with a merchant. At block 1420, the method comprises associating the gift card with an account (e.g., a financial institution account). At block 1430, the method comprises determining an offer based on the gift card, wherein the offer enables the account to receive a discount or rebate on a transaction. Therefore, the present invention additionally enables the system to transmit an offer to the user. The offer may motivate the user to execute a transaction that qualifies for at least one of the gift card or the offer.

In some embodiments, determining an offer based on the gift card comprises determining the offer based on determining a transaction determining a transaction that was executed using funds associated with the gift card. Therefore, the system may be configured to determine an offer based on the user having executed a transaction that qualifies to be paid with funds associated with the gift card. The offer (e.g., type of (product or service associated with) offer, amount of discount or rebate associated with the offer, merchant associated with offer, or the like) may be determined based on at least one of information associated with the transaction or information associated with the gift card.

Referring now to FIG. 15, a general process flow 1500 is provided for issuing or applying a gift card to an account. The process flow may be executed by a system described herein. At block 1510, the method comprises determining an offer associated with an account, wherein the offer was activated by a user of the account or automatically activated based on one or more pre-configured user preferences. At block 1520, the method comprises determining a transaction associated with the account. At block 1530, the method comprises determining the transaction qualifies for the offer. At block 1540, the method comprises determining a gift card based on at least one of the transaction or the offer. At block 1550, the method comprises issuing the gift card to the account. Therefore, the present invention enables a system to issue rebates associated with offers as gift cards (e.g., gift cards instead of monetary rebates applied to an account). The gift card may be associated with a merchant associated with the transaction or may be associated with a different merchant unassociated with the transaction. In addition to a gift card, the system may be configured to apply a rebate or discount associated with the offer to the account based on the system determining the transaction qualifies for the offer. If a transaction does not qualify for an offer, the system does not issue a gift card or a rebate to an account.

The system may be configured to transmit the information to the entity upon (e.g., immediately upon) associating the gift card with the account. Alternatively or additionally, the system may be configured to transmit the information to the entity at least one of before, substantially simultaneously with, or after receiving information associated with a transaction that qualifies for the gift card. Alternatively or additionally, the system may be configured to transmit the information to the entity periodically (e.g., every few days). Alternatively or additionally, the system may be configured to transmit the information to the entity based on occurrence of a triggering event (e.g., determining that the gift card has been unused for a predetermined period of time (e.g., following association of the gift card with the account or following possession of the gift card by the user), determining that the gift card balance is less than, equal to, or greater than a predetermined balance level, determining that the user's mobile device is within a predetermined distance of the merchant associated with the gift card, or the like).

The system may prompt the user prior to transmitting the information to the entity. The prompt may be presented on the user's computing device upon associating the gift card with the account or a predetermined period following association of the gift card with the account. The user may select an option to accept or reject transmitting the information to the entity.

Information associated with the account comprises a transaction history associated with the account. The transaction history comprises at least one of a type of a transaction, a frequency associated with the transaction, an amount associated with the transaction, or a merchant associated with the transaction. Information associated with an account may additionally comprise an account balance history (e.g., how the account balance changes over time). As used herein, a transaction may comprise a purchase, a deposit, a withdrawal, a credit, a debit, or the like. Information associated with the user comprises personal information associated with at least one of the user (or even a family member or friend associated with the user). Personal information comprises at least one of a name, a location, demographic information, salary information, contact information, residence address information, job profile information, education information, or social network information.

Information associated with the gift card may include at least one of an identification code (e.g., card number) associated with the gift card, an original value of the gift card, a current balance of the gift card, an age of the gift card, a merchant associated with the gift card, type of purchases for which the card can and/or cannot be used, expiry date of the card, authentication credentials (e.g., personal identification PIN code) associated with the card, periodic transaction assessment associated with the card, a name of the user assigned to the gift card, types of purchases that qualify for purchases associated with the gift card, a date of a last purchase that qualified for payment using the gift card, a date when the gift card was associated with the account, a transaction history associated with the gift card (e.g., purchases made using gift card funds), or the like.

The system may be configured to determine the user is within a predetermined distance of the merchant (e.g., based on determining global positioning system (GPS) coordinates associated with the user's mobile device). If the user's mobile device is determined to be located within the predetermined distance, the system is configured to transmit a message to the user reminding the user of the gift card. Additionally or alternatively, the system may be configured to transmit a periodic reminder message to the user regardless of where the user's mobile device is located. As a further example, the system may transmit a reminder message to the user if the user has not made a qualifying purchase for a predetermined period of time (e.g., the user has not made a purchase in the last couple of months).

Additionally or alternatively, the system may be configured to transmit an offer to the user along with the message (e.g., the reminder message). The offer enables the user to receive at least one of a discount or a rebate on a future transaction (e.g., a future transaction associated with the merchant associated with the gift card, or a future transaction associated with a different merchant, or the like). The offer may expire a predetermined period after the offer is transmitted to or presented to the user (e.g., a day, a week, or the like). The message specifies the expiration date of the offer.

The entity may transmit an offer to the user based on the received information (e.g., information associated with at least one of the user, the account, or the gift card). The offer may be transmitted to the system described herein, and the system may retransmit the offer to the user. Alternatively, the offer may be generated by the system. The offer is transmitted to the user via at least one of text or multimedia message, email message, social network message, or financial institution network message. The offer and the gift card may be applied to the same transaction. Alternatively, the offer and the gift card may not be applied to the same transaction (e.g., the offer and the gift card may be applied to separate transactions associated with the same merchant or associated with different merchants). The user may select an option to accept (or activate) or reject the offer. When the user activates the offer, the offer is automatically associated with the user's account. When the user rejects the offer, the offer is not associated with the user's account.

The offer (or type of offer) may be determined based on at least one of the age of the gift card or a period of inactivity associated with the gift card. As used herein, an age of the gift card is at least one of the duration for which the user has possessed the gift card or the duration of the association of the gift card with the user's account. For example, if the user has possessed the gift card for a predetermined period (e.g., two months) but has not used the gift card on a qualifying transaction for a certain period, the offer may be transmitted to the user. As a further example, if the user associated the gift card with the user's account a predetermined period ago (e.g., two months) but has not used the gift card on a qualifying transaction during a certain period, the offer may be transmitted to the user. As a further example, if the user has not executed a transaction that qualifies for payment using the gift card for a predetermined period, the offer may be transmitted to the user. Additionally, the offer may be transmitted based on a balance associated with the gift card. If the gift card has a balance that is less than, equal to, or greater than a predetermined amount, the offer may be transmitted to the user based on this triggering event. Therefore, the triggering event for transmitting an offer to the user may comprise at least one of an age of the gift card, a duration of inactivity associated with the gift card, or a certain balance of the gift card. In some embodiments, the offer may be transmitted to the user based on a time frame determined by the merchant.

Additionally, the amount of the discount or rebate associated with the offer may be based on at least one of the age of the gift card, a duration of inactivity of the gift card, or a current balance of the gift card. For example, the discount or rebate associated with the offer may be greater if the gift card is older (e.g., greater than a predetermined duration), the period of inactivity is greater (e.g., greater than a predetermined duration), or the current balance is greater (e.g., greater than a predetermined amount). Alternatively, the discount or rebate associated with the offer may be smaller if the gift card is older, the period of inactivity is greater, or the current balance is greater.

The offer or the discount or rebate associated with the offer may comprise or be in the form of a second gift card (e.g., in process flow 1400 and/or any other process flow described herein). The second gift card and the original gift card may be applied to the same transaction. Alternatively, the second gift card and the original gift card may not be applied to the same transaction (e.g., the second gift card and the original gift card may be applied to separate transactions). When the offer comprises a gift card, the user may select an option to accept (or activate) or reject the second gift card. When the user activates the second gift card, the second gift card is automatically associated with the user's account.

In some embodiments, a transaction executed by the user qualifies for the offer based on the transaction occurring during a predetermined period. In some embodiments, the transaction qualifies for the offer based on an amount associated with the transaction being greater than a predetermined amount. In some embodiments, the system is further configured to determine, when processing or settling the transaction and/or the offer, whether the offer is active and whether the offer is valid. The offer is still active if the offer has not been revoked by at least one of the financial institution or the merchant and/or if the offer has not expired. The offer is still valid if the merchant associated with the offer is not excluded under any merchant exclusion rules at the time of settlement and if the user is not excluded under any user exclusion rules at the time of settlement. In some embodiments, the transaction qualifies for the offer based on a payment method associated with the transaction. Additionally, the transaction may be executed by any user in a household of users associated with the account.

The offer is transmitted to the user based on offer information associated with the offer substantially matching at least one of user information or account information associated with the user. The account information comprises a transaction history associated with the user's financial institution account, and the transaction history comprises at least one of a type of a transaction, a frequency associated with the transaction, an amount associated with the transaction, or a merchant associated with the transaction. User information comprises personal information associated with at least one of the user, a family member of the user, or a friend of the user, wherein the personal information comprises at least one of demographic information, salary information, contact information, residence address information, job profile information, education information, or social network information. In process flow 1500, the system may determine the gift card (e.g., type of gift card, amount of gift card, or the like) based on at least one of the user information or account information described herein.

The offer is transmitted to the user (and/or the gift card is issued to the user's account in process flow 1500) based on the user not being excluded by at least one user exclusion rule and the merchant not being excluded by at least one merchant exclusion rule. The at least one user exclusion rule comprises at least one of an affinity exclusion rule, a risk exclusion rule, or an account exclusion rule, and the at least one merchant exclusion rule comprises a merchant category code exclusion rule. The at least one merchant exclusion rule is based at least partially on a list of merchants associated with an excluded merchant category code that are not excluded.

As used herein, a user exclusion rule is a rule that excludes some users from receiving offers. In some embodiments, the at least one user exclusion rule comprises an affinity exclusion rule. Therefore, if the financial institution (or a merchant partner associated with the financial institution) already has an existing relationship (e.g., for providing or sending offers associated with the particular merchant) with some users via an affinity program, those users are excluded from receiving an offer. The affinity exclusion rule comprises at least one of a full affinity exclusion rule or a partial affinity exclusion rule. When the affinity rule comprises a full affinity exclusion rule, the user is completely excluded from receiving an offer (e.g., an offer associated with a particular merchant) if the financial institution (or a merchant partner associated with the financial institution) already has an existing relationship with the user.

When the affinity rule comprises a partial affinity exclusion rule, the user is excluded from receiving an offer associated with a particular product, service, or industry associated with a particular merchant that already has an existing relationship with the user for the particular product, service, or industry, but the user may receive offers associated with other products, services, or industries associated with the particular merchant. Additionally or alternatively, the user is excluded from receiving an offer associated with a competitor of a particular merchant if that particular merchant already has an existing relationship with the user.

In some embodiments, the at least one user exclusion rule comprises a risk exclusion rule. Therefore, if a user is determined to be a risky user (e.g., has a credit score lower than a predetermined threshold), the user is excluded from receiving an offer. In some embodiments, the at least one user exclusion rule comprises an account exclusion rule. Therefore, for example, if a user's account has a balance (or another account characteristic) that is lower than predetermined threshold, the user is excluded from receiving an offer.

In some embodiments, a merchant exclusion rule is a rule that excludes some merchants from providing offers to users associated with the financial institution. In some embodiment, the at least one merchant exclusion rule comprises a merchant category code exclusion rule. Therefore, a merchant associated with a predetermined merchant category code (e.g., a healthcare code) is excluded from providing an offer. However, the financial institution may set up a list of merchants that trigger exceptions. Merchants that trigger exceptions can provide offers even if these merchants are associated with the excluded merchant category codes.

In some embodiments, the offer or the gift card is presented to the user on a portable mobile communication device. In some embodiments, the offer or the gift card is presented via at least one of a user interface associated with the user's financial institution account, a user interface associated with the user's merchant account, a user interface associated with the user's social network account, email, or text or multimedia message. For example, the offer is presented adjacent to a gift card associated with the user's account. In some embodiments, the offer comprises an offer to receive at least one of a discount or a rebate on (or a gift card for) at least one of: a purchase previously made by the user, a purchase from a merchant from which the user previously made a purchase, an alternative to the purchase previously made by the user, an alternative to the purchase from the merchant from which the user previously made a purchase, or a product or service related to a purchase previously made by the user. In some embodiments, the transaction comprises an aggregate of a plurality of purchase transactions or a largest purchase transaction. Therefore, the offer is applied to the aggregate of the plurality of purchases or to the largest purchase.

In some embodiments, the offer may specify that the user will receive a discount or rebate associated with the offer (or a gift card in process flow 1500) based on the user completing an activity and/or based on the user transmitting the offer to another user. For example, the offer may specify that the user has to complete an activity associated with the merchant associated with the offer, wherein the activity is independent of (or part of) the transaction. For example, if the offer is a 15% off offer on a minimum dine-in purchase of $50 at a restaurant, the activity may include purchasing merchandise (e.g., a T-shirt) at the restaurant. Alternatively the activity may include posting a message about the restaurant on a social network at a certain time. The activity may be independent of the user's dine-in purchase at the restaurant. Still additionally, the offer may specify that the user has to transmit the offer to a predetermined number of other users (e.g., ten other users), and may additionally specify that a predetermined percentage (e.g., 50%) of the users to whom the offer was transmitted need to execute a transaction associated with the offer either a predetermined period before or predetermined period after the user executes the transaction associated with the offer (or within a predetermined period after receiving the offer from the user). Therefore, a user successfully executes a transaction (i.e., receives a discount or rebate or a gift card) associated with the offer if, at settlement, the system determines the user completed the activity specified by the offer and/or transmitted the offer to the predetermined number of other users. Additionally, at settlement of the offer, the system may determine whether the predetermined percentage of users who received the offer from the user executed a transaction associated with the received offer within a predetermined period after receiving the offer from the user (or within a predetermined period either before or after the user's transaction associated with the offer).

In some embodiments, the processing or settlement of the transaction that qualifies for the offer is executed as part of a batch processing operation, wherein the batch processing operation comprises processing a plurality of financial institution accounts, wherein a discount or rebate associated with the offer is applied (or a gift card is issued as in process flow 1500) to a financial institution account of the user during or at the completion of the batch processing operation. In some embodiments, the clearance of the transaction comprises the processing or settlement of the transaction. Therefore, in some embodiments, the clearance of the transaction (and/or the offer) may also be referred to as the processing or settling of the transaction (and/or the offer). In other embodiments, the processing or settlement of the transaction is executed a predetermined period after clearance of the transaction.

Any features that are applicable to offers transmitted to an account may also be applicable to gift cards issued or transmitted to an account. Therefore, as used herein, in some embodiments, an offer may be referred to as a gift card, and a gift card may be referred to as an offer. Additionally, a discount or rebate associated with an offer (e.g., the discount or rebate that is applied to an account upon processing a transaction) may be a gift card that is issued to the account upon processing a transaction.

Referring now to FIG. 16, a general process flow 1600 is provided for splitting a gift card. The process flow may be executed by a system described herein. At block 1610, the method comprises receiving information associated with a gift card, the gift card associated with a merchant. At block 1620, the method comprises associating the gift card with an account (e.g., a financial institution account). At block 1630, the method comprises enabling selection of an option to split the gift card into a first portion (e.g., a first new gift card) and a second portion (e.g., a second new gift card). The present invention enables a user to split a gift card, and transmit the new gift cards to other users. When a second user receives the gift card from the user, the second user may either accept (e.g., activate) or reject the gift card. If the second user activates the gift card, the gift card becomes activated with the second user's account. As used herein, a gift card split may also be referred to as a new gift card. The user may use any of the transmission methods described herein to transmit (or transfer or re-gift) a gift card (e.g., the original gift card or the new gift card after splitting the original gift card) to a second user or to multiple second users.

The system may be configured to enable a user to determine an amount of funds (e.g., percentage amount, absolute amount, or the like) to be assigned to each new gift card.

Alternatively, the system may be configured to automatically determine an amount of funds to be assigned to each new gift card based on pre-configured user preferences established by the user. Additionally, upon receiving the user's selection to split the gift card, the system may be configured to automatically set aside (or assign) an absolute or percentage amount of the gift card to the account (e.g., a savings portion of the account). The amount set aside may have been selected by the user prior to the user selecting the option to split the gift card or may be selected by the user upon the user selecting the option to split the gift card. The user may even choose not to set aside or assign an amount of the gift card to the account.

In addition to receiving the new gift card from the user, the second user may also receive information associated with the original gift card (e.g., identification information, balance information, or any other information associated with the original gift card) from the user. Features described herein that are applicable to the original gift card associated with the user are also applicable to the new gift card associated with the second user. For example, when the second user associates the new gift card with the second user's account, information associated with at least one of the new gift card, the second user, or the second user's account may be transmitted to an entity (e.g., the merchant) as described herein. As used herein, information associated with the new gift card may also comprise information associated with the original gift card. Additionally, information associated with the new gift card includes information indicating that the new gift card originated based on splitting the original gift card. This enables the entity to know where the new gift card originated from.

As a further example, the second user may redeem his or her new gift card based on the various processes described herein. For example, when the second user transmits a redemption request to an entity (e.g., the merchant), the second user's account may receive funds associated with the new gift card. The redemption request may comprise information associated with the new gift card and/or information associated with the original gift card that was received along with the transmission of the new gift card from the user. The amount of funds redeemed by the second user may be greater than, equal to, or less than the amount of funds associated with the new gift card.

The user may transmit the new gift card to the second user via at least one of email, text or multimedia message, a social network, or a financial institution network. Alternatively or additionally, the user may transmit the new gift card to an alias associated with the second user. For example, the alias may comprise a phone number, email address, or social networking identification information associated with the second user. Therefore, the second user may have pre-registered the second user's alias with the entity (e.g., financial institution) associated with the second user's account. Therefore, when the user sends the gift card to the alias, the entity receives the gift card, interprets the alias, and forwards the gift card to the second user's account. Therefore, the second user receives the gift card without providing the second user's account information to the user.

The new gift card may be transmitted to the second user via readable indicia, wherein the readable indicia comprises information associated with the new gift card. As used herein, information associated with a gift card may comprise a link to information associated with a gift card. For example, the user may use an application on the user's computing device (e.g., mobile device) to generate readable indicia associated with the new gift card that the user intends to transmit to the second user. The readable indicia may comprise any indicia, visual or non-visual, associated with the gift card, where information associated with the indicia is receivable or readable (e.g., scannable) by a mobile device. The readable indicia may comprise visual indicia, e.g., a barcode, a Quick Response (QR) code, or the like. The readable indicia may comprise any one-dimensional or two-dimensional code.

The user may present the readable indicia on the user's mobile device and may allow the second user to capture an image of the readable indicia using an image-capturing component (e.g., camera) associated with the second user's device. Alternatively, the user may transmit the readable indicia to the second user via at least one of email, text or multimedia message, social networking message, or financial institution network message. Upon receiving the readable indicia, the second user's device processes the readable indicia, and prompts the second user to accept (e.g., activate) or reject the new gift card. Upon accepting or activating the new gift card, the new gift card is associated with the second user's account. As a further example, the generated readable indicia is comprised in a tag (e.g., radio frequency identification (RFID) tag, near field communication (NFC) tag, or the like) associated with the user's computing device, wherein the tag is located inside or outside the user's computing device. The second user may bring a mobile device in close proximity to the tag in order to receive information (e.g., readable indicia) associated with the tag.

Referring now to FIG. 17, FIG. 17 presents an exemplary user interface for splitting a gift card. When the user selects an option to split the gift card, the user is presented with the user interface of FIG. 17. The user may define an absolute or percentage amount of funds to be applied to the first new gift card 1710, and an absolute or percentage amount of funds to be applied to the second new gift card 1720. Additionally, the user interface presents the amount of funds remaining 1730 in the original gift card based on subtracting the amounts applied to the new gift cards. If the user applies the entire balance of the original gift card to the new gift cards, the amount of funds remaining in the original gift card is zero. If the amount of funds remaining in the original gift card is zero, the system may be configured to communicate this information to the merchant. In some embodiments, the system may be configured to communicate the amount of reduced funds to the merchant, regardless of whether the amount of funds is reduced to zero. In some embodiments, the system may be configured to communicate to the merchant information (e.g., balance information) associated with the original gift card and the new gift cards upon the splitting of the original gift card. The system may or may not require user approval to transmit this information to the merchant.

Referring now to FIG. 18, a general process flow 1800 is provided for enabling bill payment using a gift card. The process flow may be executed by a system described herein. At block 1810, the method comprises receiving information associated with a gift card, the gift card associated with a merchant. At block 1820, the method comprises associating the gift card with an account (e.g., a financial institution account or merchant account associated with user). At block 1830, the method comprises enabling payment of a bill associated with the merchant using funds associated with the gift card. The present invention enables a user to apply gift card funds to a bill (e.g., a bill associated with a merchant associated with the gift card). Therefore, the gift card payment may be processed as a bill payment transaction.

The bill may be associated with a merchant associated with the gift card (may be referred to as the gift card merchant). Therefore, the bill may be for a merchant account associated with the user, wherein the merchant account is not associated with the gift card, but wherein a bill associated with the merchant account is electronically received into the user account (e.g., financial institution account) associated with the gift card. Alternatively, the bill may be associated with a merchant different from the merchant associated with the gift card. Therefore, a gift card associated with a first merchant may be used to pay a bill associated with a second merchant unassociated with the first merchant. As used herein, a merchant account may comprise a merchant-branded account such as a credit account. In alternate embodiments, the gift card may be associated with the user's merchant account, and the gift card can be used for paying a balance of the merchant account.

The account may comprise at least one of a credit or debit account. The account may even comprise a pre-paid account. In some embodiments, the account may comprise at least one of an online or mobile banking account. Therefore, if the user does not want to use the gift card funds to make a purchase associated with the merchant, the user may use the gift card funds to pay a bill associated with the user's merchant account or by applying the gift card funds to a balance of the user's merchant account.

As an example, the user may choose to use a $50 gift card to pay a bill. In order to use the gift card to pay the bill, the system described herein may enable the user to liquidate the gift card for less than the face value amount (e.g., $45) associated with the gift card. As used herein, the liquidated funds may be provided by the system (e.g., the financial institution associated with the account) or some other entity. Therefore, the user may apply the liquidated $45 to pay the bill. The entity (e.g., financial institution) associated with the system described herein may sell (or re-sell) the gift card to a third-party for $47, thereby enabling the entity to make a profit. Additionally, the user receives value because the user can use the gift card to pay the user's bill. The bill may or may not be associated with the merchant associated with the gift card.

Upon (e.g., immediately upon) associating the gift card with the account (or upon redeeming funds associated with the gift card) or a predetermined period following association of the gift card with the account (or a predetermined period following redemption of funds associated with the gift card), the system alerts the user to the option to pay a bill associated with the merchant using the gift card (e.g., a gift card associated with the same merchant). Therefore, the user may apply the gift card to a balance of a merchant account (or merchant-branded account such as a credit account) associated with the user. The alert may be communicated with at least one of an email, a text or multimedia message, a social network message, or a financial institution network message. Additionally or alternatively, the alert may be communicated via pop-up message on the user's computing device (e.g., mobile computing device). Additionally or alternatively, the alert may comprise an audio alert.

Upon associating the gift card with the account, the system may compare the name (or other identification information such as merchant identification number) of the merchant associated with the gift card with the name (or other identification information) of the merchant associated with the account (e.g., when the account is a merchant account) or the name (or other identification information) of a merchant associated with a bill that the user has pre-configured to associate with the account (e.g., via a bill pay feature associated with the account). A bill may be associated with an account or received by the account either before or after associating a gift card with the account. If the system finds a substantial match (e.g., to a predetermined degree of statistical confidence) between the identification information, the system presents to the user the option to enable bill payment using the gift card. Therefore, the system enables the user to pay the bill using gift card funds via a bill payment feature associated with the user's account (e.g., online banking account, mobile banking account, or the like). Additionally, or alternatively, the user may initiate an application (e.g., a mobile wallet application, a mobile payment application, or the like) on the user's mobile device, and apply the gift card to a balance of the user's merchant account using the application. Therefore, the user may apply the gift card to a balance of an account without issuance (or prior to issuance) of a bill associated with the account.

Using the various processes described herein, the system is configured to communicate with the merchant or another entity to transmit a redemption request and/or redeem the gift card before, substantially simultaneously with, or after enabling payment of the bill. In some embodiments, the system may be configured to enable payment of the bill without transmitting a redemption request and/or redeeming the gift card. As used herein, a first event that occurs substantially simultaneously with a second event may be equivalent to a first event occurring in "real-time" or in "near real-time" either during or following the second event.

The user may select an amount of gift card funds to apply to the bill payment. Therefore, the user may choose to apply an entire or partial amount of gift card funds to the bill payment. When the user selects an option to apply the gift card to a bill payment, the system applies the gift card to the bill. If the amount of the bill is greater than the amount of funds associated with the gift card, the system applies the funds (e.g., an entire amount of funds) associated with the gift card to the bill, and enables the user to select an option to apply general funds associated with the account to the remainder of the bill. Alternatively, the system may automatically apply general funds associated with the account to the remainder of the bill. As used herein, a bill may also refer to a balance of an account (e.g., a credit account). Therefore, paying a bill may also represent paying a balance of an account. The account may be the account associated with the gift card or a different account unassociated with the account associated with the gift card.

Referring now to FIG. 19, a general process flow 1900 is provided for enabling gift card combination. The process flow may be executed by a system described herein. At block 1910, the method comprises receiving information associated with a first gift card and associating the first gift card with an account. At block 1920, the method comprises receiving information associated with a second gift card and associating the second gift card with an account. At block 1930, the method comprises enabling combining the first gift card and the second gift card into an asset determined by a user of the account. The present invention enables a user to combine multiple gift cards into at least one asset determined by a user of the account. The at least one asset comprises a single asset or a plurality of assets.

The second gift card may be unassociated with the first gift card. The second gift card may be associated with the same merchant or a different merchant from that associated with the first gift card.

The asset comprises a third gift card associated with a merchant or merchant category determined by the user. For example, the third gift card may be a merchant associated with (or not associated with) the first or second gift card. The merchant or merchant categories may be presented in a drop-down list on the account interface so that the user may select a desired merchant or merchant category. The amount (e.g., value, face value, balance, or the like) of the third gift card may be based on a current balance of the first gift card and a current balance of the second gift card. Alternatively or additionally, the asset comprises points (e.g., reward points, loyalty points, or the like) associated with a merchant or merchant category determined by the user. The points may be used to make a purchase associated with the particular merchant selected by the user or one of a plurality of merchants associated with a selected merchant category. Alternatively or additionally, the asset comprises funds (e.g., cash). An amount of the funds is at least one of less than, equal to, or greater than a sum of a current balance of the first gift card and a current balance of the second gift card. Alternatively or additionally, the asset enables payment of a bill (e.g., via an electronic bill pay feature associated with the account). The bill may or may not be associated with a merchant associated with the first gift card or the second gift card. The bill may be a balance of a merchant account as described herein.

Any features described herein with respect to a gift card may be applicable to an asset. Therefore, the user may use a payment method associated with the account to make a purchase that qualifies to be paid using the asset. Therefore, the system is configured to receive information associated with a transaction, determine the transaction qualifies for the asset (e.g. a third gift card), and apply funds associated with the asset to the transaction. The transaction qualifies for the asset based on rules established by the merchant or the system described herein. For example, the transaction qualifies to be paid using the asset if the transaction is associated with a particular merchant or merchant category associated with the asset (e.g., gift card), the transaction was executed during a predetermined period (or before a predetermined expiration time), the transaction is associated with a particular type of purchase (service, good, or the like), the transaction was executed by a particular user associated with the account, the transaction was executed at particular location, the transaction satisfied a particular minimum or maximum transaction amount, the transaction was executed using a particular payment method, or the like.

After the user selects the option to combine the first gift card and the second gift card into the asset described herein, the account interface may present the user with the various assets (e.g., gift card, points, funds, or the like) into which the first gift card and the second gift card may be converted. The system may be configured to initiate presentation on an account interface of a comparison of various assets (and their values, e.g., monetary values or amounts) that can result from combining the first gift card and the second gift card. For example, the value (or amount) of a gift card generated by the combination of the first gift card and the second gift card may be different from a value of points or funds generated by the combination of the first gift card and the second gift card. For example, the amount of the funds generated by the combination may be less than the amount of a gift card or points generated by the combination. The amount of the funds generated by the combination may be less than or equal to a sum of the current balance of the first gift card and the second gift card. The value (or monetary amount) of the gift card or points generated by the combination may be less than, equal to, or greater than a sum of the current balance of the first gift card and the second gift card. Additionally, the available merchants or merchant categories associated with a gift card generated by the combination may be the same as or different from the available merchant or merchant categories associated with points generated by the combination.

The system may be configured to enable combining the first gift card and the second gift card into an asset determined by a user of the account based on at least one of determining a balance of the first gift card is one of less than, equal to, or greater than a predetermined balance and determining a balance of the second gift card is one of less than, equal to, or greater than a predetermined balance. The predetermined balance for the first gift card may be the same as or different from the predetermined balance for the second gift card. Therefore, the predetermined balance may be based on any information associated with a gift card as described herein (e.g., merchant, merchant category, age, duration of inactivity, or any other information associated with the gift card as described herein). Therefore, the system presents on the account interface an option to convert a gift card to an asset described herein if a current balance of a gift card is at least one of less than, equal to, or greater than a predetermined balance amount. If the current balance of the gift card is not at least one of less than, equal to, or greater than the predetermined balance amount, the option to convert a gift card to an asset is not presented on the account interface. As used herein, a presentation of information (e.g., the option to combine gift cards) on an account interface refers to at least one of visual presentation, aural presentation, or the like.

The system may be configured to present an option to convert a single gift card into an asset described herein based on determining a balance of the first gift card is one of less than, equal to, or greater than a predetermined balance. Additionally or alternatively, the system may be configured to present an option to combine two gift cards based on determining a balance of only one of the gift cards is one of less than, equal to, or greater than a predetermined balance (while the other gift card has a balance that is not one of less than, equal to, or greater than a predetermined balance).

The system is configured to transmit a message to the user notifying the user of an option to combine the first gift card and the second gift card into the asset determined by the user. The message is transmitted via at least one of email, text or multimedia message, a social network, or a financial institution network. The message may be transmitted based on occurrence of a triggering event. For example, the message may be transmitted when the current balance of a gift card is less than or equal to (or greater than) a predetermined balance amount. As a further example, the message may be transmitted upon associating a gift card with an account, upon executing a predetermined number of transactions that qualify for the gift card, or the like.

The system may enable to user to reconvert the asset into the first gift card and the second gift card. For example, for a predetermined period following combination (or conversion) of the first gift card and the second gift card into the asset, the account user interface may present an option to reconvert the asset into the first gift card and the second gift card. Once the predetermined period expires, the user cannot select the option to reconvert the asset into the first gift card and the second gift card. The predetermined period may be selected by the entity that manages the system described herein. Alternatively, the predetermined period may expire once the user uses the asset to make a purchase, pay a bill, or the like.

Referring now to FIGS. 20-21, FIGS. 20 and 21 present exemplary user interfaces for enabling gift card combination, in accordance with embodiments of the present invention. As presented in FIG. 20, the user interface presents an option 2030 for the user to combine Gift Card 1 2010 and Gift Card 2 2020. As described herein, the option may be presented if at least one of or both the gift cards have a balance that is less than or equal to (or even greater than) a predetermined balance. When the user selects the option to combine the gift cards, the user is presented with the user interface in FIG. 21. The user may choose to combine the gift cards into a new gift card 2110, points 2120, cash 2130, or a bill payment 2140. When the user selects option 2110 or 2120, the user may be presented with options to choose gift cards or points associated with different merchants (a gift card or points associated with a first merchant may have different value (e.g., face value) from a gift card or points associated with a second merchant). For option 2130, the user interface indicates the amount of funds based on combining the first gift card and the second gift card. When the user selects option 2140, the user may be presented with options to choose among various bills associated with different merchants.

Referring now to FIG. 22, a general process flow 2200 is provided for processing a transaction. The process flow may be executed by a system described herein. At block 2210, the method comprises receiving information (e.g., transaction information) associated with a transaction executed using a payment method associated with an account, the information including an alias associated with the account and an amount of the transaction. At block 2220, the method comprises determining, based on accessing a database, whether the alias is associated with a gift card. At block 2230, the method comprises in response to determining the alias is associated with the gift card, determining whether the transaction qualifies for the gift card. At block 2240, the method comprises in response to determining the transaction qualifies for the gift card, applying a balance of the gift card to the amount of the transaction. The present invention enables an entity (e.g., an acquirer) located on the transaction processing path to process the transaction based on the features described herein. Alternatively or additionally, the present invention may enable another entity (e.g., an issuer such as a financial institution, a merchant, a card network, or the like) located on the processing path to process the transaction based on the features described herein. Therefore, the system or the module associated with the system (and any features described herein) may be associated with any of the entities disclosed herein (e.g., acquirer, merchant, issuer, card network, user, or the like). As used herein, an alias associated with the account may refer to identification information associated with the account (e.g., last four characters or digits of account number or some other identification code that corresponds to the account). The identification number may not include the entire account number. The alias may be extracted from information received from a payment method or payment vehicle as described herein.

As used herein, a financial institution associated with an account may refer to any entity that manages the account (e.g., a financial institution, a merchant, a social network entity, or the like). The merchant and the acquirer may refer to the same entity or may refer to different entities. The payment terminal described herein may be associated with at least one of the merchant, the acquirer, the issuer, or the user. The acquirer and the issuer may refer to the same entity or may refer to different entities. As used herein, in some embodiments, an acquirer, an issuer, a card network, a merchant may refer to any entity disclosed herein.

Referring now to FIG. 23, FIG. 23 is a block diagram providing an overview of a system and environment 2300 for making a payment at a physical point of sale or online point of sale (e.g., payment via a network such as the Internet). A user 2310 provides a payment vehicle or method such as cash, mobile device payment, payment card (e.g., credit card, debit card, or the like), or the like, at a point of sale. The user 2310 may, for example, swipe a payment card, manually input payment information into the user's computing device (e.g., for an online payment), input a code, or communicate via near field communication using a mobile device with a point of sale (POS) device 2322. The POS device 2322 transmits data obtained from the payment vehicle such as a financial institution identification code or issuer identification code, and/or a payment authorization code along with other transaction data such as purchase or transaction amount and an alias associated with the account extracted from the payment vehicle or method (collectively referred to as transaction information) to a payment gateway 2324. In some embodiments, the POS device 2322 and/or payment gateway is maintained or otherwise associated with a merchant 2320. In other embodiments, the POS device 2322 and/or payment gateway may comprise a user's computing device (e.g., mobile computing device) when the user makes an online payment or a physical payment (e.g., a payment based on transmitting information by near field communication (NFC) technology).

The transaction information is transmitted from the POS device 2322 to the acquirer 2330 (e.g., a financial clearing house). The system of the acquirer 2330 transmits the transaction information to the card network 2340. In some embodiments, the card network 2340 transmits the transaction information to the issuer 2350. The issuer 2350 may include, for example, the financial institution associated with the payment vehicle and/or user and/or account 2310 or any other entity that is authorized to approve or reject payments. For example, in a closed looped system, the issuer 2350 may be a university associated with a student/employee payment card, a merchant, a technology provider, or the like.

In other embodiments, the acquirer 2330 transmits the transaction information to the issuer 2350. The issuer 2350 determines whether to approve transmittal of the payment associated with the payment vehicle or reject the transmittal of the payment. The system of the issuer 2350 sends the issuer's response back to the POS device 2322 via at least one of the system of the acquirer 2330 or card network 2340. If the response from the issuer 2350 authorizes payment using the payment vehicle, the POS device 2322 accepts the payment. The POS device 2322 declines payment if the response from the issuer 2350 is negative.

Thus, the transaction information travels on a processing path. The transaction information travels from the point-of-sale system (e.g., associated with the merchant, acquirer, user, or the like) to the acquirer, optionally to a card network, and then to the financial institution associated with the account, wherein the financial institution authorizes or rejects the transaction based on the received transaction information. The authorization or rejection may be communicated to the point-of-sale system (or to the acquirer). The present invention enables the acquirer to apply the gift card to the transaction. Therefore, the present invention enables application of the gift card to the transaction prior to the transaction information arriving at the financial institution for authorization of the transaction. In alternate embodiments, the financial institution (or any other entity on the transaction processing path such as the acquirer, card network, merchant, or the like) may apply the gift card to the transaction at least one of before, during, or after authorization of the transaction or at settlement of the transaction which happens a predetermined period (e.g., a few seconds, hours, days, or the like) following authorization of the transaction. The authorization and settlement of the transaction may be executed by the financial institution.

In alternate embodiments, the acquirer may transmit, along the transaction processing path, a first message (e.g., comprising the transaction information and/or any gift cards that may applied to the transaction) to the issuer in order to seek authorization of the transaction. After authorization for the transaction has been received, the acquirer applies the gift cards to the transaction. Following application of the gift cards to the transaction, the transaction information is updated and transmitted along the transaction processing path to the issuer. Therefore, the acquirer may apply the gift cards to the transaction either before or after authorization for the transaction is received from the issuer. As used herein, an issuer may refer to a financial institution or any other entity that manages the user's account.

The system is additionally configured to update the transaction information, wherein the updated transaction information includes an updated amount associated with the transaction, and transmit the updated information to another entity on the transaction processing path (e.g., a financial institution associated with the account). In some embodiments, the updated transaction information may include updated information associated with the gift card (e.g., an updated gift card balance as described below or any other information (e.g., identification information) associated with a gift card as described herein). The updated amount of a gift card is a reduced amount. For example, the original transaction amount may be $100. The balance of the gift card may be $50. Therefore, after the balance of the gift card is applied to the original transaction amount, the updated transaction amount is $50. The updated gift card amount is zero. The system transmits the updated transaction information (including the updated transaction amount of $50) to another entity (e.g., a financial institution) on the transaction processing path. Therefore, the financial institution authorizes or rejects the $50 transaction, not a $100 transaction, though the financial institution may receive an indication in the transaction information that the original transaction amount was $100 and since the transaction qualified for a gift card, the gift card was applied to the transaction (e.g., by the acquirer) thereby reducing the transaction amount to $50. In embodiments where the financial institution, rather than the acquirer, applies the gift card to the transaction at least one of before, during, or after authorization (or at settlement), the transaction amount received in the transaction information by the financial institution is for a $100 transaction.

Additionally, and separately from the transmission of the transaction information, the system may transmit the updated gift card amount (along with other information associated with the gift card such as identification information) to at least one of the financial institution associated with the account or the merchant associated with the gift card. In some embodiments, the updated gift card amount is transmitted only if a positive balance is remaining on the gift card after applying the gift card to the transaction, while in other embodiments, the updated gift card amount is transmitted regardless of the balance remaining on the gift card.

As another example, the original transaction amount may be $100. The balance of the gift card may be $150. Therefore, after the balance of the gift card is applied to the original transaction amount, the updated transaction amount is $0. The updated gift card amount is $50. The system transmits the updated transaction information (including the updated transaction amount of $0) to another entity (e.g., a financial institution) on the transaction processing path. Therefore, the financial institution authorizes or rejects the $0 transaction, not a $100 transaction, though the financial institution may receive an indication in the transaction information that the original transaction amount was $100 and since the transaction qualified for a gift card, the gift card was applied to the transaction (e.g., by the acquirer) thereby reducing the transaction amount to $0. Since the updated transaction amount is $0, the financial institution may automatically authorize the transaction. In other embodiments, if the transaction amount after applying the gift card is $0, the system may not need to seek approval from the financial institution.

Determining whether the transaction qualifies for the gift card comprises determining whether the gift card has a positive balance. If the gift card has a positive balance, the gift card is applied to the transaction amount, thereby reducing the transaction amount. If the gift card does not have a positive balance (e.g., has a zero balance), the gift card is not applied to the transaction amount. Therefore, the transaction amount may remain unchanged.

The database described herein comprises a list of aliases and a list of gift cards associated with each alias in the list of aliases. The system receives the database (or information to be input into the database) from the financial institution associated with the account (and/or from a merchant associated with the gift card). Therefore, the database comprises a database record for each alias and a database record for each gift card associated with each alias. The database record for each gift card may comprise any information associated with a gift card as described herein. As described herein, information associated with the card may include an identification code (e.g., card number) associated with the gift card, an amount or balance of the gift card, a merchant or merchant category associated with the gift card, type of purchases for which the card can and/or cannot be used, expiry date of the card, authentication credentials (e.g., personal identification PIN code) associated with the card, periodic transaction assessment associated with the card, a name of the user assigned to the gift card, or the like.

Upon or during processing a transaction, updated gift card information may be applied to the database described herein so that the database record associated with the gift card is updated. The database record associated with each gift card may comprise a current balance of a gift card and rules for determining whether a transaction qualifies for the gift card. The rules may be provided by a financial institution associated with the account, or may be provided by the merchant associated with the gift card. For example, the rules may comprise the transaction qualifies for the gift card based on at least one of the transaction being associated with a particular merchant or merchant category, the transaction being executed during a predetermined period or before a predetermined expiration time, the transaction being associated with a particular type of purchase, the transaction being executed by a particular user associated with the account (e.g., when an account is associated with multiple users), the transaction being executed at a particular location, the transaction being executed using a particular payment method, the transaction satisfying a predetermined minimum or maximum transaction amount, or the like. In some embodiments, the gift card information in the database is updated by the financial institution, and not by the system associated with the acquirer.

As described herein, a payment method associated with an account comprises at least one of a payment card payment, an electronic funds transfer, or a mobile device payment. Additionally, as described herein, the account comprises at least one of a financial institution account, a social networking account, or a merchant account associated with a user.

A user may associate multiple gift cards with the user's account. Subsequently, a user may execute a transaction that qualifies for multiple gift cards. The issuer (e.g., financial institution) that manages the account may establish rules for applying the multiple gift cards to the transaction. The issuer may communicate to the acquirer information associated with these multiple gift cards and the rules for applying the multiple gift cards. For example, a user may execute a transaction at an electronics merchant. First, a merchant-specific gift card associated with the electronic merchant is applied to the transaction. If there is remaining balance, a category-specific gift card is applied to the transaction. A category-specific gift card may be applied to transactions associated with multiple electronics merchants (e.g., electronics merchants selected by the issuer or a user, or merchants associated with a particular merchant category (MCC) code). The category-specific gift card may have been received by the user from another user. Next, if there still is a remaining balance, a generic gift card (e.g., a gift card associated with a card network, a user-created gift card, a gift card received from another user that is not restricted to any merchants or merchant categories) is applied to the transaction. In some embodiments, a generic gift card may refer to funds transmitted to the user's account from another account. Finally, if there still is a remaining balance, funds from the user's account are applied to the transaction. In alternate embodiments where the gift card is applied by the issuer (e.g., the financial institution) to the transaction, the multiple gift cards are applied by the issuer to the transaction based on the rules established by the issuer.

As described herein, in some embodiments, upon receiving transaction information associated with a transaction executed by a user, the acquirer extracts an alias from the transaction information and pings or accesses a database to determine gift cards associated with the alias. In alternate embodiments, upon receiving the transaction information, the acquirer may transmit a message (e.g., an inquiry message) to the issuer (e.g., along the transaction processing path indicated in FIG. 23). The message may include at least one of the alias or elements of the transaction information. In response to receiving the message, the issuer may transmit a return message to the acquirer, wherein the return message includes information associated with gift cards associated with the alias. The acquirer may then apply the gift cards to the transaction.

In other embodiments, the acquirer receives information associated with one or more gift cards directly from the user. For example, at the payment terminal, during the transaction, the payment terminal (associated with the acquirer, merchant, issuer, card network, user, or the like) may ask or prompt the user whether the user has any gift cards associated with the user's account. If the user responds 'Yes,' the payment terminal or system described herein (e.g., associated with the acquirer, merchant, issuer, card network, user, or the like) then transmits a message to the issuer (e.g., the financial institution) requesting the issuer to transmit information associated with the user's gift cards to the acquirer. The message transmitted to the issuer may include the alias associated with the user's account and may include transaction information associated with the transaction. The issuer may transmit all the gift cards (and information associated with each gift card such as rules associated with applying the gift card, gift card balance, or the like) associated with the user's account to the acquirer, and the acquirer may apply the gift cards to the transaction based on rules established by the issuer. Alternatively, the issuer may transmit only those gift cards (and information associated with each gift card such as rules associated with applying the gift card, gift card balance, or the like) that are applicable to the transaction (e.g., based on rules established by the issuer and based on the identity of the merchant extracted from the transaction information), and the acquirer may apply the gift cards to the transaction based on the rules established by the issuer. In some embodiments, the issuer transmits both gift cards and rules for applying the gift cards to the acquirer together. In other embodiments the issuer separately transmits to the acquirer the gift cards and the rules for applying the gift cards. Even in embodiments where the issuer applies the gift cards to the transaction, the acquirer may prompt the user to respond to the question of whether the user has any gift cards associated with the user's account. The answer to the user's question may be included in the transaction information transmitted along the transaction processing path from the acquirer to the issuer.

Alternatively, when the payment terminal prompts the user to respond to the question of whether the user has any gift cards, the user may provide information associated with the gift cards, wherein the information is stored on the user's payment vehicle (e.g., on the user's payment card, mobile device, or the like). Therefore, when the user provides the user's payment vehicle for payment (e.g., by scanning the payment vehicle, swiping the payment vehicle, manually entering the payment information, or the like), information associated with the gift cards is also transmitted to the payment terminal and the acquirer. Therefore, the acquirer may obtain information associated with the user's gift cards without communicating with the issuer and/or without accessing a database that stores information associated with gift cards.

In other embodiments, the user may provide the user's payment vehicle for payment and then the payment terminal prompts the user to respond to the question of whether the user has any gift cards. If the user responds 'Yes,' the payment terminal may prompt the user to provide the user's payment vehicle for payment again. When the user provides the user's payment vehicle for payment again, information associated with the user's gift card cards is transmitted to the payment terminal.

In some embodiments, a gift card may be associated with a user's profile (or loyalty card) associated with a merchant. The profile may have been previously established by at least one of the merchant, the acquirer, the issuer, the card network, or the user. When the user uses a payment vehicle to make a payment, the payment terminal or system described herein (e.g., associated with the merchant, acquirer, issuer, card network, user or the like) extracts the user's identification information (e.g., name, identification code, alias, or the like) from the payment vehicle and accesses the user's profile to determine whether any gift cards (e.g., with a positive balance) can be applied to the user's transaction.

In some embodiments, as described herein, a merchant's loyalty program is managed by the issuer (e.g., the financial institution) associated with the user's account. Therefore, when the user executes a transaction, transaction information is communicated along the transaction processing path from the payment terminal to the acquirer to the issuer. The issuer may transmit information associated with both the user's loyalty card and the user's gift cards to the acquirer. Based on any rules established by the issuer, the gift cards may be applied to the transaction (e.g., applied to the transaction by the acquirer). Either prior to or after application of the gift card, the loyalty card may be applied to the transaction (e.g., applied to the transaction by the acquirer). As described below, the loyalty card may be associated with points that can be applied to the transaction, thereby reducing the balance of the transaction. Additionally, upon application of the loyalty card to the transaction, the system (e.g., associated with the merchant, acquirer, the issuer, the card network, or the user) may determine based on the transaction executed by the user, transaction history associated with the user, and loyalty rules established by the issuer (and optionally user information associated with the user) whether the user is eligible to receive a reward. In embodiments where the acquirer determines whether a user is eligible to receive a reward, the issuer may enable the acquirer to access information associated with the user's transaction history, user's user information, loyalty rules, or the like.

As described herein, prior to applying gift cards to a transaction or after applying gift cards to a transaction, the merchant may apply points (e.g., loyalty points) to the transaction. Therefore, when the payment terminal or system (e.g., associated with the merchant, acquirer, the issuer, the card network, the user, or the like) described herein recognizes the user (e.g., based on extracting identification information (e.g., a name, an identification code, an alias, or the like) associated with the user from the payment vehicle used by the user), the acquirer may receive points previously earned by the user by accessing the user's profile based on the user's identification information. These points may be applied to the transaction amount, thereby reducing the transaction amount.

In some embodiments, a rule established by the issuer may be that the gift card is applied to the transaction based on the payment vehicle or method used by the user. For example, if the user pays via credit (e.g., a credit card), one or more gift cards may not be applied to the transaction (e.g., applied to the transaction by the acquirer or the issuer). As a further example, if the user pays via debit (e.g., a debit card), one or more gift cards may be applied to the transaction (e.g., applied to the transaction by the acquirer or the issuer).

Referring now to FIG. 24, a general process flow 2400 is provided for applying loyalty rules. The process flow may be executed by a system described herein. At block 2410, the method comprises receiving a rule from a merchant. At block 2420, the method comprises receiving information associated with a transaction executed by the user, the transaction being associated with the merchant. At block 2430, the method comprises receiving information associated with the user's transaction history for transactions associated with the merchant, the transaction history being associated with a predetermined period. At block 2440, the method comprises determining, based on the rule, the information associated with the transaction, and the information associated with the transaction history, whether to issue a reward to the user's account. The present invention enables an entity that manages the user's account (e.g., a financial institution) to run a loyalty program on behalf of a merchant.

The system is configured to initiate visual presentation of an option to view the user's transaction history (e.g., associated with a particular merchant) on a user interface associated with the user's account. The transaction history comprises a list of transactions (e.g., associated with a particular merchant), and at least one of a date associated with each transaction, an amount associated with each transaction, a type of purchase (e.g., service or good) associated with each transaction, a user associated with each transaction (e.g., when there are multiple users (e.g., a husband and a wife) associated with an account), a payment method associated each transaction, a location of execution associated with each transaction, an indication of whether the transaction was a physical transaction at a merchant's location or whether the transaction was an online transaction, or the like. Additionally or alternatively, the system is configured to initiate visual presentation of a virtual loyalty card on a user interface associated with the user's account. The system may be configured to prompt a user to view the transaction history or the virtual loyalty card when the system determines, based on receiving location information (e.g., global positioning system (GPS) coordinates) associated with the user's mobile device that the user's mobile device is located within a predetermined distance from the merchant's location (e.g., the merchant associated with the loyalty card).

The system is configured to transmit a message to the user informing the user of the reward (e.g., the type of reward, when the reward will be issued, or the like) during or after the transaction. As used herein, a type of reward may refer to at least one of a discount, a rebate, an offer, a gift card, a product, a service, or the like. The system may present an option to the user to either accept or reject the reward. Additionally, the system may be configured to transmit, prior to the transaction, a message to the user informing the user of an opportunity to earn a reward. For example, the system may be configured to transmit the message when the system determines, based on location coordinates associated with the user's mobile device, that the user's mobile device is located within a predetermined distance from the merchant's location. The system may be configured to transmit a message to the user informing the user of the reward (e.g., the type of reward, when the reward will be issued, or the like) if the user visits the merchant's location and executes a qualifying transaction. Additionally, the message may specify that the user needs to execute the transaction within a predetermined period.

The message transmitted to the user may indicate the type of transaction(s) that needs to be executed by a user in order to earn particular reward(s). The type of transaction may comprise a type of service or good that needs to be purchased, a minimum or maximum transaction amount, a period of time within which the transaction needs to be executed, a particular payment method that needs to be used to pay for the transaction, a user associated with the account who needs to execute the transaction, or the like. The message may be transmitted via at least one of email, text or multimedia message, social network message, or financial network message.

In some embodiments, the entity may transmit a message to the user regardless of the location of the user's mobile device. For example, the entity may transmit a reminder message to the user if the user has not made a purchase that qualifies for a reward for a predetermined period of time (e.g., the preceding one month). The reminder message may state that the user has made nine qualifying transactions and needs to make one more qualifying transaction in order to receive a reward. Additionally or alternatively, the entity may also transmit an offer to the user either along with or separately from the reminder message. The offer enables the user to receive at least one of a discount or a rebate on a future transaction (e.g., a future transaction associated with the merchant associated with the gift card, or a future transaction associated with a different merchant, or the like). The user may need to activate the offer (e.g., prior to the transaction, after the transaction prior to settlement of the transaction, or the like) in order to receive the discount or the rebate on the transaction. The offer may expire a predetermined period after the offer is transmitted to or presented to the user (e.g., a day, a week, or the like). The message specifies the expiration date of the offer. Therefore, when the user makes a subsequent transaction that qualifies for both the reward and the offer, the user receives the reward and the benefit associated with the offer (e.g., an additional discount on the transaction). Any features described herein with respect to any other offers are applicable to the offer transmitted to the user.

The system is configured to determine, based on one or more exclusion rules, whether to exclude the user's account from receiving the reward or from enrolling in a loyalty program. As used herein, a user exclusion rule is a rule that excludes some users from receiving rewards or enrolling in a loyalty program. In some embodiments, the at least one user exclusion rule comprises an affinity exclusion rule. Therefore, if the financial institution (or a merchant partner associated with the financial institution) already has an existing relationship (e.g., for providing rewards associated with a particular merchant) with some users via an affinity program, those users are excluded from receiving a reward or enrolling in a loyalty program. The affinity exclusion rule comprises at least one of a full affinity exclusion rule or a partial affinity exclusion rule. When the affinity rule comprises a full affinity exclusion rule, the user is completely excluded from receiving a reward based on the user executing a purchase transaction associated with a particular merchant (or enrolling in a loyalty program associated with the particular merchant) if the financial institution (or a merchant partner associated with the financial institution) already has an existing relationship with the user. When the affinity rule comprises a partial affinity exclusion rule, the user is excluded from receiving a reward (or enrolling in a loyalty program associated with a particular merchant) based on the user executing a purchase transaction of a particular product or service (or class of products or services) associated with a particular merchant that already has an existing relationship with the user for the particular product or service (or class of products or services), but the user may receive a reward (or enroll in a loyalty program associated with a particular merchant) based on the user executing purchase transactions of other products or services (or other product or service classes) associated with the particular merchant. Additionally or alternatively, the user is excluded from receiving a reward (or enrolling a loyalty program) based on the user executing a transaction at a competitor of a particular merchant if that particular merchant already has an existing relationship with the user.

In some embodiments, the at least one user exclusion rule comprises a risk exclusion rule. Therefore, if a user is determined to be a risky user (e.g., has a credit score lower than a predetermined threshold), the user is excluded from receiving a reward or being eligible to participate in a loyalty program. In some embodiments, the at least one user exclusion rule comprises an account exclusion rule. Therefore, for example, if a user's account has a balance (or another account characteristic) that is lower than predetermined threshold, the user is excluded from receiving a reward or being eligible to participate in a loyalty program.

The reward is further based on user information associated with the user, the user information comprising personal information associated with at least one of the user, a family member of the user, or a friend of the user, wherein the personal information comprises at least one of demographic information, salary information, contact information, residence address information, job profile information, education information, or social network information.

In some embodiments, the reward comprises a discount on the transaction, wherein the discount comprises an entire or partial amount of the transaction. Therefore, for example, the discount may comprise an absolute or percentage amount off the transaction. Additionally or alternatively, the reward (or the discount) may comprise a monetary rebate applied to the user's account a predetermined period after the transaction. The reward may be based on a predetermined number of transactions associated with the merchant executed by the user, wherein the predetermined number of transactions is executed in a predetermined period. Therefore, for example, the reward may be based on an average amount associated with the predetermined number of transactions, or may be based on a highest or lowest transaction amount from among the predetermined number of transactions.

As described herein, the reward is based on one or more loyalty rules received from the merchant. The rules may dictate that the reward (e.g., whether the reward will be issued, the type of reward, when the reward will be issued, or the like) is based on at least one of the transaction is executed during a predetermined period or before a predetermined expiration time, a predetermined number of transactions (e.g., a minimum of five transactions) are executed during a predetermined period or before a predetermined expiration time, the transaction is associated with a particular type of purchase, the transaction is executed by a particular user associated with the account, the transaction is executed using a predetermined payment method, the transaction is executed at a particular location, the transaction satisfies a predetermined minimum or maximum transaction amount, or the like.

Additionally or alternatively, the reward comprises at least one of a gift card or an offer. The gift card or the offer may be directly transmitted to the account (e.g., during or upon processing the transaction). Any features described herein with respect to a gift card or an offer may be applicable to the transmitted gift card or offer. The offer or the gift card may be associated with the merchant that issued the loyalty rules, or may be associated with a different merchant (e.g., a merchant selected by the user).

Additionally or alternatively, the reward comprises at least one of a discounted or free product or service. For example, the reward may comprise a free coffee when the user qualifies to receive a reward from a local coffee shop (assuming the user previously enrolled in a loyalty program associated with the local coffee shop).

The transaction described herein is executed at a physical point-of-sale system or the transaction comprises an online transaction via a network. The payment method associated with the transaction comprises at least one of a payment card payment, an electronic funds transfer, or a mobile device payment. The account comprises at least one of a financial institution account, a social networking account, or a merchant account associated with a user.

As described herein, in some embodiments, the reward is issued to the user's account during or upon processing the transaction. The processing of the transaction may be executed as part of a batch processing operation, wherein the batch processing operation comprises processing a plurality of accounts. The processing of the transaction may also be referred to as settlement of the transaction. Therefore, in embodiments described herein, the reward is not issued to the account by the point-of-sale system associated with the merchant; instead the reward is issued by the entity (e.g., financial institution) that manages the account described herein.

In some embodiments, the user receives the reward described herein if the user enrolls in the loyalty program at least one of prior to, during, or after (e.g., prior to processing of the transaction) executing the transaction. When the user enrolls in the loyalty program, the system described herein pulls or accesses the transaction history of the user (and optionally user information associated with the user) to determine, during or upon processing of the transaction, whether to issue a reward to the user. In some embodiments, if the user does not enroll in the loyalty program, the user does not receive the reward described herein even if the user's transaction qualifies for the reward (e.g., based on the transaction, the transaction history, the user information, or the like).

Additionally or alternatively, the reward is issued to the user's account based on the system receiving information associated with the user performing an activity not associated with the transaction. For example, a rule received from the merchant may specify that the user has to complete an activity associated with the merchant, wherein the activity is independent of (or part of) the transaction. For example, the activity may include posting a message about the merchant on a social network at a certain time. Therefore, a user receives a reward if, at settlement, the system determines the user's transaction qualifies for the reward and that the user completed the specified activity (e.g., based on receiving activity information from the social network).

In some embodiments, the system may enable the user to determine at least one of a type of the reward or when to receive the reward. For example, the system may enable the user to determine whether to receive the reward in the form of at least one of a discount, a rebate, a gift card, an offer, or the like. Additionally, the system may enable the user to determine when to receive the reward (e.g., after a fifth qualifying transaction, after a tenth qualifying transaction, or the like).

Referring now to FIGS. 25-26, FIGS. 25-26 are exemplary user interfaces for applying loyalty rules, in accordance with embodiments of the present invention. FIG. 25 illustrates a user interface accessible from the user's account. The user's account may store multiple loyalty cards 2510 and 2520 associated with various merchants. When the user selects Loyalty Card 1 2510, the user is presented with the user interface of FIG. 26. The virtual loyalty card 2610 indicates transactions that have been previously executed by the user and transactions that need to be executed by the user in order to receive a reward. A transaction that has been previously executed by the user has a different visual presentation from a transaction that needs to be executed by the user in the future.

When the user selects a transaction 2620 that has been executed by the user, the user interface presents information associated with the transaction described herein. For example, the information may include a date associated with the transaction, an amount associated with the transaction, a type of purchase (e.g., service or good) associated with the transaction, a user who executed the transaction, a payment method associated with the transaction, a location associated with the transaction, an indication of whether the transaction was a transaction at a merchant's location (e.g., a physical transaction) or whether the transaction was an online transaction, or the like.

When the user selects a transaction 2630 that needs to be executed by the user, the user interface presents information associated with loyalty rules that need to be satisfied in order to execute a qualifying transaction. The rules may indicate the transaction needs to be executed during a predetermined period or before a predetermined expiration time, the transaction needs to be associated with a particular type of purchase, the transaction needs to be executed by a particular user associated with the account, the transaction needs to be executed using a predetermined payment method, the transaction needs to be executed at a particular location, the transaction needs to satisfy a predetermined minimum or maximum transaction amount, the transaction needs to be an online transaction or a physical transaction, or the like. Additionally, the rules associated with one of the remaining transactions may be different from the rules associated one of the other remaining transactions. For example, transaction X6 may have to satisfy a different set of rules from transaction X7.

Any of the features described herein with respect to a particular process flow or interface are also applicable to any other process flow or interface. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. As used herein, the term "upon" may be substituted with "in response to." As used herein, execution of a transaction may comprise at least one of authorization of a transaction or settlement of a transaction.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for enabling gift card combination, the apparatus comprising:
   a memory;
   a processor; and
   a module stored in the memory, executable by the processor, and configured to:
      receive information associated with a first gift card, wherein the first gift card is associated with funds and not points;
      associate the first gift card with an account;
      receive information associated with a second gift card, wherein the second gift card is associated with funds and not points, wherein the second gift card is associated with a different merchant from the first gift card;
      associate the second gift card with the account;
      enable combining the first gift card and the second gift card into an asset determined by a user of the account based on determining a balance of the first gift card is less than or equal to a predetermined balance and determining a balance of the second gift card is less than or equal to the predetermined balance; and
      initiate presentation of a comparison of various assets generated based on a combination of the first gift card and the second gift card, wherein the various assets comprise at least two different types of assets.

2. The apparatus of claim 1, wherein the second gift card is unassociated with the first gift card.

3. The apparatus of claim 1, wherein the asset comprises a third gift card associated with a merchant or merchant category determined by the user.

4. The apparatus of claim 1, wherein an amount of the third gift card is based on a balance of the first gift card and a balance of the second gift card.

5. The apparatus of claim 1, wherein the asset comprises points associated with a merchant or merchant category determined by the user.

6. The apparatus of claim 1, wherein the asset comprises funds.

7. The apparatus of claim 6, wherein an amount of the funds is at least one of less than, equal to, or greater than a sum of a balance of the first gift card and a balance of the second gift card.

8. The apparatus of claim 1, wherein the asset enables payment of a bill.

9. The apparatus of claim 1, wherein the asset comprises a plurality of assets.

10. The apparatus of claim 1, wherein the module is configured to enable combining the first gift card and the second gift card into the asset determined by the user based on at least one of determining a balance of the first gift card is greater than or equal to a first predetermined balance or determining a balance of the second gift card is greater than or equal to a second predetermined balance.

11. The apparatus of claim 1, wherein the module is configured to transmit a message to the user notifying the user of an option to combine the first gift card and the second gift card into the asset determined by the user, wherein the message is transmitted via at least one of email, text or multimedia message, a social network, or a financial institution network, wherein the message is transmitted based on occurrence of a triggering event.

12. The apparatus of claim 1, wherein the asset can be reconverted into the first gift card and the second gift card.

13. The apparatus of claim 1, wherein the account comprises at least one of a financial institution account, a social networking account, or a merchant account.

14. The apparatus of claim 1, wherein the module is further configured to:
receive information associated with a transaction;
determine the transaction qualifies for the asset; and
apply funds associated with the asset to the transaction.

15. The apparatus of claim 14, wherein the transaction qualifies for the asset if the transaction is associated with a merchant or merchant category associated with the asset, wherein the transaction is executed using a payment method associated with the account.

16. The apparatus of claim 14, wherein the transaction qualifies for the asset based on at least one of the transaction is executed during a predetermined period or before a predetermined expiration time, the transaction is associated with a particular type of purchase, the transaction is executed by a particular user associated with the account, the transaction is executed at a particular location, the transaction is executed using a particular payment method, or the transaction satisfies a predetermined minimum or maximum transaction amount.

17. A method for enabling gift card combination, the method comprising:
receiving, using a computing device processor, information associated with a first gift card, wherein the first gift card is associated with funds and not points;
associating, using a computing device processor, the first gift card with an account;
receiving, using a computing device processor, information associated with a second gift card, wherein the second gift card is associated with funds and not points, wherein the second gift card is associated with a different merchant from the first gift card;
associating, using a computing device processor, the second gift card with the account;
enabling, using a computing device processor, combining the first gift card and the second gift card into an asset determined by a user of the account based on determining a balance of the first gift card is less than or equal to a predetermined balance and determining a balance of the second gift card is less than or equal to the predetermined balance; and
initiating, using a computing device processor, presentation of a comparison of various assets generated based on a combination of the first gift card and the second gift card, wherein the various assets comprise at least two different types of assets.

18. A computer program product for enabling gift card combination, the computer program product comprising:
a non-transitory computer-readable medium comprising a set of codes for causing a computer to:
receive information associated with a first gift card, wherein the first gift card is associated with funds and not points;
associate the first gift card with an account;
receive information associated with a second gift card, wherein the second gift card is associated with funds and not points, wherein the second gift card is associated with a different merchant from the first gift card;
associate the second gift card with the account;
enable combining the first gift card and the second gift card into an asset determined by a user of the account based on determining a balance of the first gift card is less than or equal to a predetermined balance and determining a balance of the second gift card is less than or equal to the predetermined balance; and
initiate presentation of a comparison of various assets generated based on a combination of the first gift card and the second gift card, wherein the various assets comprise at least two different types of assets.

* * * * *